US012762700B2

(12) United States Patent
Iwane

(10) Patent No.: US 12,762,700 B2
(45) Date of Patent: Oct. 13, 2026

(54) MEDICAL IMAGE PROCESSING APPARATUS, METHOD FOR OPERATING MEDICAL IMAGE PROCESSING APPARATUS, AND NON-TRANSITORY COMPUTER READABLE MEDIUM

(71) Applicant: FUJIFILM Corporation, Tokyo (JP)

(72) Inventor: Kosuke Iwane, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 151 days.

(21) Appl. No.: 18/616,216

(22) Filed: Mar. 26, 2024

(65) Prior Publication Data

US 2024/0265540 A1 Aug. 8, 2024

Related U.S. Application Data

(63) Continuation of application No. PCT/JP2022/034597, filed on Sep. 15, 2022.

(30) Foreign Application Priority Data

Sep. 30, 2021 (JP) ................................ 2021-162022

(51) Int. Cl.
*G06T 7/00* (2017.01)
*G06T 5/73* (2024.01)
*G06T 11/00* (2026.01)

(52) U.S. Cl.
CPC .............. *G06T 7/0012* (2013.01); *G06T 5/73* (2024.01); *G06T 11/00* (2013.01);
(Continued)

(58) Field of Classification Search
CPC ......... G06T 7/0012; G06T 5/73; G06T 11/00; G06T 2207/10068; G06T 2207/10081;
(Continued)

(56) References Cited

U.S. PATENT DOCUMENTS 12,232,689 B2 * 2/2025 Takenouchi ........... G16H 30/40
2019/0183462 A1 * 6/2019 Yang .................. G06F 18/2413
(Continued)

FOREIGN PATENT DOCUMENTS

JP 2005124756 5/2005
WO 2018008593 1/2018
(Continued)

OTHER PUBLICATIONS

"International Search Report (Form PCT/ISA/210) of PCT/JP2022/034597," mailed on Nov. 15, 2022, with English translation thereof, pp. 1-5.

(Continued)

*Primary Examiner* — King Y Poon
*Assistant Examiner* — Patrick P Galera
(74) *Attorney, Agent, or Firm* — JCIPRNET

(57) ABSTRACT

A medical image processing apparatus performs, based on an acquired medical image, an image recognition process; performs control to display the medical image and a result of the image recognition process on a display; performs, based on the medical image, an inappropriate region detection process of detecting an inappropriate region which is a region inappropriate for the image recognition process; and performs, based on a detection result of the inappropriate region detection process, control to report the detection result.

17 Claims, 27 Drawing Sheets

(52) U.S. Cl.
CPC ............... *G06T 2207/10068* (2013.01); *G06T 2207/10081* (2013.01); *G06T 2207/10088* (2013.01); *G06T 2207/30004* (2013.01)

(58) Field of Classification Search
CPC . G06T 2207/10088; G06T 2207/30004; G06T 7/00; A61B 1/045; A61B 5/00
See application file for complete search history.

(56) References Cited

U.S. PATENT DOCUMENTS

| | | | |
|---|---|---|---|
| 2019/0311475 A1 | 10/2019 | Hosoi | |
| 2020/0193236 A1* | 6/2020 | Oosake | G06V 10/454 |
| 2021/0251470 A1* | 8/2021 | Kimura | G06T 7/20 |
| 2021/0274999 A1 | 9/2021 | Kubota et al. | |
| 2023/0071400 A1* | 3/2023 | Abdolell | G16H 30/40 |

FOREIGN PATENT DOCUMENTS

| | | |
|---|---|---|
| WO | 2019123986 | 6/2019 |
| WO | 2020054543 | 3/2020 |
| WO | 2020084752 | 4/2020 |
| WO | 2020110214 | 6/2020 |

OTHER PUBLICATIONS

"Written Opinion of the International Searching Authority (Form PCT/ISA/237) of PCT/ JP2022/034597," mailed on Nov. 15, 2022, with English translation thereof, pp. 1-12.
"Notice of Reasons for Refusal of Japan Counterpart Application", issued on Feb. 24, 2026, with English translation thereof, p. 1-p. 15.
"Decision of Refusal of Japan Counterpart Application", issued on Jul. 7, 2026, with English translation thereof, pp. 1-9.

* cited by examiner

121

| INAPPROPRIATE FACTOR | REMOVAL METHOD |
|---|---|
| RESIDUE | SUPPLY WATER TO THE PHOTOGRAPHIC SUBJECT (RESIDUE) |
| UNSHARPNESS | SLOW DOWN SCOPE OPERATION |
| | SHORTEN THE EXPOSURE TIME |
| LENS DIRT | SUPPLY AIR AND WATER TO THE LENS SURFACE |
| | |

FIG. 22

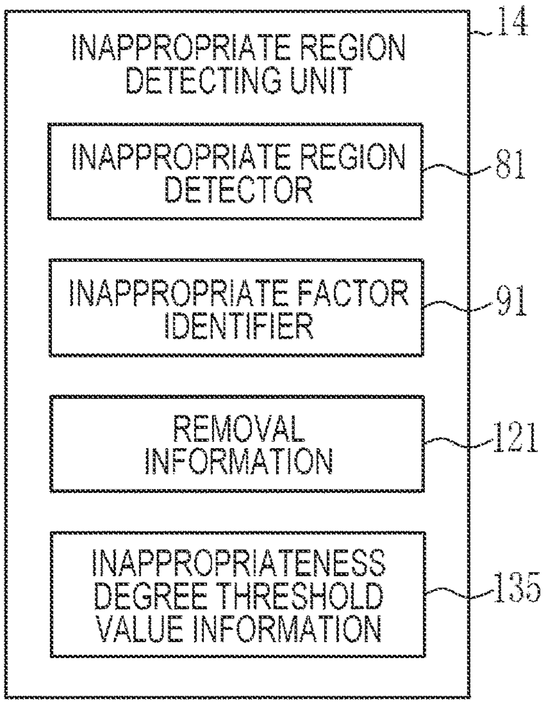

FIG. 23

135

| INAPPROPRIATE FACTOR | INAPPROPRIATENESS DEGREE | THRESHOLD VALUE | |
|---|---|---|---|
| | | DETECTION PROCESS | CLASSIFICATION PROCESS |
| RESIDUE | RATIO OF AREA TO ENDOSCOPIC IMAGE | 20% OR MORE | 20% OR MORE |
| UNSHARPNESS | RATIO OF AREA TO ENDOSCOPIC IMAGE | NOT REPORTED ANYTIME | 10% OR MORE |
| LENS DIRT | RATIO OF AREA TO ENDOSCOPIC IMAGE | 10% OR MORE | 10% OR MORE |
| CORRECT DIAGNOSIS RATE | CORRECT DIAGNOSIS RATE | 70% OR LESS | 50% OR LESS |

MEDICAL IMAGE PROCESSING APPARATUS, METHOD FOR OPERATING MEDICAL IMAGE PROCESSING APPARATUS, AND NON-TRANSITORY COMPUTER READABLE MEDIUM

CROSS-REFERENCE TO RELATED APPLICATIONS

This application is a Continuation of PCT International Application No. PCT/JP2022/034597 filed on 15 Sep. 2022, which claims priority under 35 U.S.C § 119(a) to Japanese Patent Application No. 2021-162022 filed on 30 Sep. 2021. The above application is hereby expressly incorporated by reference, in its entirety, into the present application.

BACKGROUND OF THE INVENTION

1. Field of the Invention

The present invention relates to a medical image processing apparatus, a method for operating the medical image processing apparatus, and a non-transitory computer readable medium.

2. Description of the Related Art

In the medical field, an image recognition process is performed using medical images acquired by various modalities, such as an endoscope, a computed tomography (CT) apparatus, or magnetic resonance imaging (MRI), to acquire diagnosis assistance information for assisting a doctor in making a diagnosis. In recent years, various methods for acquiring desired information through an image recognition process using a machine learning technique have been developed.

An image recognition process of detecting a lesion based on a medical image has been known. Regarding endoscope systems, there has been known an endoscope system or the like that controls reporting means or the like to report a lesion portion, based on the degree of oversight risk of a lesion being overlooked by a user (WO2020/110214A1, corresponding to US2021/0274999A1).

SUMMARY OF THE INVENTION

In the case of performing an image recognition process based on a medical image, the reliability or accuracy of the image recognition process can be increased by effectively performing the image recognition process, and the risk of overlooking a lesion or the like can be reduced depending on the lesion or the like.

An object of the present invention is to provide a medical image processing apparatus, a method for operating the medical image processing apparatus, and a non-transitory computer readable medium that are capable of acquiring an image recognition process result with higher reliability or accuracy.

A medical image processing apparatus of the present invention includes a processor. The processor is configured to acquire a medical image including an image of a subject; perform, based on the medical image, an image recognition process; perform control to display the medical image and a result of the image recognition process on a display; perform, based on the medical image, an inappropriate region detection process of detecting an inappropriate region which is a region inappropriate for the image recognition process; and perform, based on a detection result of the inappropriate region detection process, control to report the detection result.

Preferably, the inappropriate region detection process specifies a position of the inappropriate region in the medical image, and the detection result includes the position of the inappropriate region in the medical image.

Preferably, the processor is configured to perform at least one of control to report the detection result by an image displayed on the display, control to report the detection result by vibration generated by vibration generation means, or control to report the detection result by sound generated by sound generation means.

Preferably, the processor is configured to perform control to display, on the display including a main region and a sub-region, the medical image in the main region and the detection result in the sub-region.

Preferably, the processor is configured to perform control to display, on the display, a superimposed image obtained by superimposing the detection result on the medical image.

Preferably, the processor is configured to perform, based on the medical image, an inappropriate factor identification process of identifying an inappropriate factor in which the inappropriate region is inappropriate for the image recognition process; and perform, based on an identification result of the inappropriate factor identification process, control to report the identification result.

Preferably, the identification result includes a plurality of the inappropriate factors, and the processor is configured to perform control to report the identification result in a mode that varies among the inappropriate factors.

Preferably, the identification result includes a plurality of the inappropriate factors, and the processor is configured to perform, based on a composite inappropriate factor obtained by combining at least two of the plurality of inappropriate factors, control to report the identification result.

Preferably, the inappropriate factor is a blur or unsharpness in the medical image, an image of water, blood, a residue, or lens dirt in the medical image, or an image of a dark portion or a halation portion in the medical image.

Preferably, the inappropriate factor is a correct diagnosis rate being lower than or equal to a preset value, the correct diagnosis rate being calculated based on the result of the image recognition process.

Preferably, the medical image processing apparatus includes removal information in which the inappropriate factor and a method for removing the inappropriate factor are associated with each other, the inappropriate factor identification process refers to the inappropriate factor and the removal information to acquire a method for removing the inappropriate factor in the inappropriate region, and the identification result includes the method for removing the inappropriate factor in the inappropriate region.

Preferably, the processor is configured to control an imaging apparatus that captures an image of the subject to generate the medical image, and perform control to cause the imaging apparatus to execute the method for removing the inappropriate factor.

Preferably, the inappropriate region detection process identifies, on an individual inappropriate factor basis, an inappropriateness degree indicating a degree of inappropriateness for the image recognition process, and the processor is configured to perform, based on the inappropriateness degree, control to vary a mode of reporting the detection result.

Preferably, the processor is configured to, when performing control to report the detection result, set a threshold value related to the reporting in advance, and perform, based on the threshold value related to the reporting, control to vary a mode of reporting the detection result.

Preferably, the processor is connected to an image storage unit, and the processor is configured to perform control to store, in the image storage unit, the medical image and an information-superimposed image that is obtained by superimposing at least one of the result of the image recognition process, the detection result, or the identification result on the medical image.

Preferably, the processor is connected to an image storage unit, and the processor is configured to perform control to store, in the image storage unit, an information-accompanied image obtained by adding at least one of the result of the image recognition process, the detection result, or the identification result to accompanying information of the medical image.

Preferably, the processor is configured to calculate, based on the inappropriate region that the medical image has, a quality index of the medical image, and perform control to display the quality index on the display.

Preferably, the medical image is acquired in an examination of the subject, and the processor is configured to perform control to display an overall examination score on the display, the overall examination score being calculated based on the quality index of each of a plurality of the medical images acquired in the examination.

A method for operating a medical image processing apparatus of the present invention includes a step of acquiring a medical image including an image of a subject; a step of performing, based on the medical image, an image recognition process; a step of performing control to display the medical image and a result of the image recognition process on a display; a step of performing, based on the medical image, an inappropriate region detection process of detecting an inappropriate region which is a region inappropriate for the image recognition process; and a step of performing, based on a detection result of the inappropriate region detection process, control to report the detection result.

A non-transitory computer readable medium of the present invention is for storing a computer-executable program that causes a computer to execute a process of acquiring a medical image including an image of a subject; a process of performing, based on the medical image, an image recognition process; a process of performing control to display the medical image and a result of the image recognition process on a display; a process of performing, based on the medical image, an inappropriate region detection process of detecting an inappropriate region which is a region inappropriate for the image recognition process; and a process of performing, based on a detection result of the inappropriate region detection process, control to report the detection result.

According to the present invention, it is possible to acquire an image recognition process result with higher reliability or accuracy.

BRIEF DESCRIPTION OF THE DRAWINGS

FIG. 22 is a block diagram illustrating functions of the inappropriate region detecting unit including inappropriateness degree threshold value information;

FIG. 23 is an explanatory diagram describing inappropriateness degree threshold value information;

DESCRIPTION OF THE PREFERRED EMBODIMENTS

Figure 1:
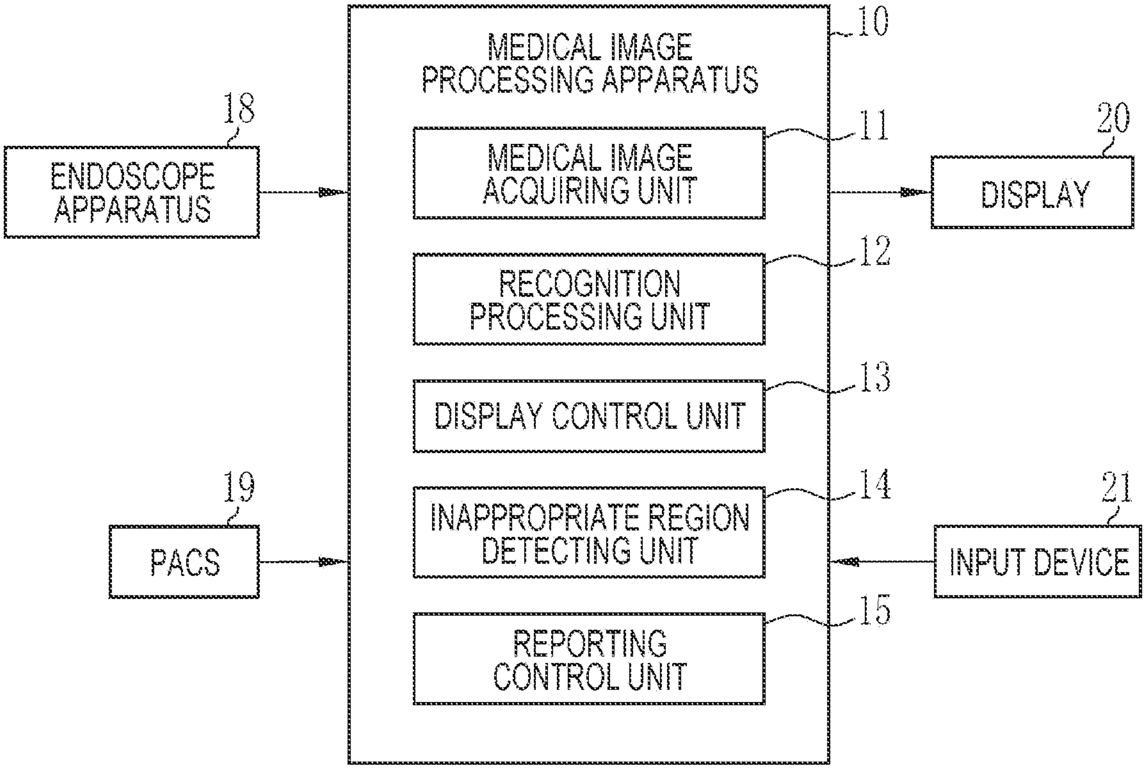
FIG. 1 is a block diagram illustrating functions of a medical image processing apparatus.

An example of a basic configuration of the present invention will be described. As illustrated in FIG. 1, a medical image processing apparatus 10 includes a medical image acquiring unit 11, a recognition processing unit 12, a display control unit 13, an inappropriate region detecting unit 14, and a reporting control unit 15. The medical image processing apparatus 10 is connected to an endoscope apparatus 18, various modalities (not illustrated) for X-ray examinations or the like, an examination information system (not illustrated) such as a radiology information system (RIS) or an endoscope information system, an apparatus capable of outputting a medical image such as a picture archiving and communication system (PACS, a medical image management system) 19, a display device such as a display 20, an input device 21 such as a keyboard, and so forth.

The medical image processing apparatus 10 performs an image recognition process based on a medical image acquired from the endoscope apparatus 18 or the like, and performs control to display the medical image and an image recognition process result for the medical image on the display 20. A doctor who is a user uses the medical image and the image recognition process result displayed on the display 20 for diagnosis. In addition, the medical image processing apparatus 10 performs, based on the medical image, an inappropriate region detection process of detecting an inappropriate region, which is a region inappropriate for an image recognition process, and performs control to report a detection result of the inappropriate region detection process to the doctor. When the detection result includes a report that an inappropriate region has been detected, the doctor can recognize that the medical image used in the image recognition process has a region inappropriate for the image recognition process. On the other hand, when there is no report that an inappropriate region has been detected, the doctor can recognize that the medical image used in the image recognition process does not have a region inappropriate for the image recognition process.

The medical image is an examination moving image or still image mainly acquired in an examination and is, for example, a medical image handled by the PACS 19. Specifically, the medical image is an X-ray image acquired in an X-ray examination, an MRI image acquired in an MRI examination, a CT image acquired in a CT examination, an endoscopic image acquired in an endoscopic examination, or an ultrasound image acquired in an ultrasound examination.

The medical image processing apparatus 10 operates during or after an examination. Thus, the medical image processing apparatus 10 acquires a medical image in real time during an examination, or acquires a medical image stored in an apparatus that stores various medical images after an examination. The medical image processing apparatus 10 then performs a subsequent operation based on the acquired medical image.

The image recognition process includes various recognition processes performed using a medical image and may be, for example, a region-of-interest detection process of detecting a region of interest such as a lesion, a classification process of classifying the type of disease for a lesion, an area recognition process of recognizing an imaged area, or the like. These processes may each include two or more types of processes, for example, a region-of-interest detection process may also serve as a classification process.

The image recognition process is performed by an image recognizing learning model that is constructed by performing learning on a machine learning algorithm. The image recognizing learning model is a learning model that has been trained, adjusted, and so forth so as to output a target result in response to input of a medical image in each process. Specifically, in the case of learning in a region-of-interest detection process, a learning data set is composed of a medical image and correct answer data of a region of interest that the medical image has. The medical image and the result of the image recognition process are displayed on the display 20. The user checks the result of the recognition process displayed on the display 20 and uses the result as diagnosis assistance information to make a diagnosis.

The inappropriate region detection process is a process of detecting an inappropriate region in a medical image and is performed in parallel with the image recognition process. The inappropriate region detection process is performed by an inappropriate region detecting learning model or the like that is constructed by performing learning on a machine learning algorithm. The inappropriate region detecting learning model is a learning model that has been trained, adjusted, and so forth so as to output an inappropriate region in response to input of a medical image. Specifically, a learning data set is composed of a medical image and correct answer data of an inappropriate region in the medical image.

Correct answer data of an inappropriate region indicating an inappropriate region in a medical image is determined based on the medical image by a doctor and is assigned to the medical image, for example. When an image recognition process is performed based on a medical image, a region having a low correct diagnosis rate or a region for which output of a target result has failed may be added as an inappropriate region to the medical image. Whether the image recognition process has failed in outputting a target result is determined based on a result of a diagnosis made by a doctor viewing a medical image, or a result of an examination such as biopsy, and a result of the recognition process.

Here, a correct diagnosis rate indicates the degree to which the result of a recognition process using various learning models, such as an image recognition process performed on a medical image, is the same as the result of a diagnosis made by a doctor. For example, a correct diagnosis rate may be a percentage at which a result of an image recognition process of a region-of-interest detection process performed on a medical image is the same as a result of a diagnosis made by a doctor on an actual situation of a subject in a medical image including a result of an examination such as biopsy, and a result of a region of interest diagnosed by the doctor. Thus, a region having a low correct diagnosis rate is a region having a small percentage at which a result of an image recognition process matches a diagnosis result made by a doctor for a medical image.

The correct answer data of an inappropriate region may include correct answer data about an inappropriate factor, which is a cause of the inappropriate region. Regarding the correct answer data about an inappropriate factor, a doctor may view a medical image and assign correct answer data about an inappropriate factor, or correct answer data of an inappropriate region and an inappropriate factor may be assigned to a medical image by using an inappropriate factor acquired through identification by an inappropriate factor identifying learning model for identifying an inappropriate factor.

The correct answer data about an inappropriate factor may be, when assigned by a doctor, assigned by the doctor by viewing a medical image and making a determination. An inappropriate factor determined by a doctor is, for example, an image with an inappropriate focus, such as a blur or unsharpness; an image of something other than a subject, such as water, blood, a residue, or dirt or fogging of a lens; an inappropriately exposed image, such as a dark portion or a halation portion, or the like in a medical image.

An inappropriate factor may be a region in which a correct diagnosis rate calculated based on a result of an image recognition process is lower than or equal to a preset threshold value. In a region in which the correct diagnosis rate of an image recognition process is low, a region in which an image recognition process has failed, or the like, it may be impossible for some doctors to determine the factor. An inappropriate factor identifier 91 (see FIG. 12) is capable of identifying an inappropriate factor even if a doctor is incapable of determining the factor in a region in which the correct diagnosis rate of an image recognition process is low, a region in which an image recognition process has failed, or the like. The inappropriate factor identifier 91 and so forth will be described below.

Reporting that is performed in response to an inappropriate region being detected by an inappropriate region detection process can be performed using a method that enables a doctor to recognize that an inappropriate region has been detected in a medical image. For example, as a result of displaying, on the display 20 that displays an acquired medical image, a notification indicating that an inappropriate region has been detected, the doctor is able to recognize that a region inappropriate for an image recognition process has been detected in a medical image by the inappropriate region detection process. When there is no reporting, the doctor is able to recognize that a region inappropriate for an image recognition process has not been detected in a medical image by the inappropriate region detection process.

When an inappropriate region is present in a medical image when an image recognition process is performed, an image recognition process may be inappropriately performed. For example, when a subject in a medical image includes a region of interest such as a lesion, an inappropriate region may hinder an image recognition process of detecting the region of interest from correctly detecting the region of interest.

An inappropriate factor in an inappropriate region arises regardless of the presence or absence of a region of interest such as a lesion in a medical image. That is, when a subject in a medical image includes only a normal region with no lesion or the like, an inappropriate region may cause an image recognition process of detecting a region of interest to detect a region of interest. As described above, in the case of making a diagnosis by using a result of an image recognition process as diagnosis assistance information, an inappropriate diagnosis may be made.

The medical image processing apparatus 10 detects an inappropriate region that is inappropriate for performing an image recognition process on a medical image, and reports the inappropriate region to a doctor, regardless of whether a lesion or the like is present. Thus, for example, when the doctor is able to recognize a factor responsible for an inappropriate region by viewing a medical image displayed on the display 20 and the inappropriate region reported by display and remove the inappropriate factor, the doctor is able to take action in an examination, for example, change an environment of capturing a medical image. Thus, the doctor is able to remove the inappropriate factor and acquire a more reliable or accurate result of an image recognition process.

When detection of an inappropriate region is reported to the doctor by the medical image processing apparatus 10, the doctor is able to recognize the possibility that the result of the image recognition process displayed on the display 20 may have an unreliable portion due to the presence of the inappropriate region, even if the doctor is unable to recognize the factor responsible for the inappropriate region. Thus, more attention can be paid to the result of the image recognition process than in a case where a result of detection of an inappropriate region is not acquired. As described above, even when a factor responsible for an inappropriate region is unrecognizable, a report indicating detection of the inappropriate region is useful information about the reliability or accuracy of the result of the image recognition process, and the doctor is able to automatically acquire the information. On the other hand, when there is no report about an inappropriate region during an inappropriate region detection process, the doctor is able to recognize that the result of the image recognition process has certain reliability or accuracy.

As described above, the medical image processing apparatus 10 enables the doctor to acquire a highly reliable or accurate image recognition process result by reporting an inappropriate region, for a medical image including an inappropriate region, a medical image including no inappropriate region, or a normal region including no region of interest such as a lesion as well as a region in which a region of interest has been detected.

Figure 2:
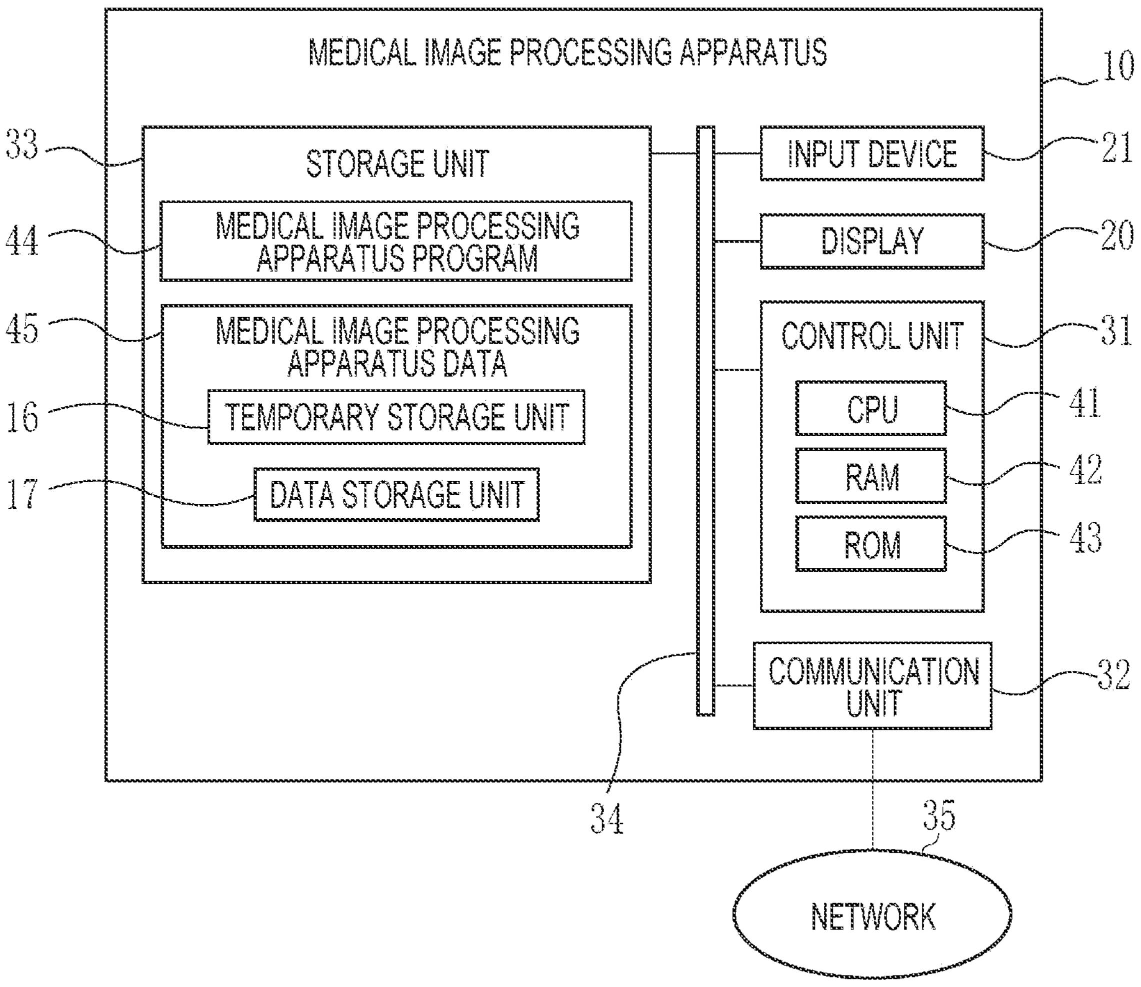
FIG. 2 is a block diagram describing the configuration of the medical image processing apparatus.

An exemplary embodiment of the medical image processing apparatus 10 according to the present invention will be described. As illustrated in FIG. 2, the medical image processing apparatus 10 according to the present embodiment has a hardware configuration, which is a computer including the input device 21 serving as an input device, the display 20 serving as an output device, a control unit 31, a communication unit 32, and a storage unit 33 that are electrically connected to each other via a data bus 34.

The input device 21 is an input device such as a keyboard, a mouse, or a touch panel of the display 20. The display 20 is a kind of output device. The display 20 displays various operation screens in accordance with operations of the input device 21 such as a mouse or a keyboard. Each operation screen is equipped with an operation function using a graphical user interface (GUI). The computer constituting the medical image processing apparatus 10 is capable of receiving an input of an operation instruction from the input device 21 through the operation screen.

The control unit 31 includes a central processing unit (CPU) 41 serving as a processor, a random access memory (RAM) 42, a read only memory (ROM) 43, and the like. The CPU 41 loads a program stored in the storage unit 33 or the like to the RAM 42 or the ROM 43 and executes processing in accordance with the program, thereby centrally controlling individual components of the computer. The communication unit 32 is a network interface that controls transmission of various pieces of information via a network 35. The RAM 42 or the ROM 43 may have a function of the storage unit 33.

The storage unit 33 is an example of a memory and is, for example, a hard disk drive, a solid state drive, or a disk array including a plurality of hard disk drives or the like that is built in the computer constituting the medical image processing apparatus 10 or is connected thereto through a cable or a network. The storage unit 33 stores a control program, various application programs, various data to be used for these programs, display data of various operation screens accompanying these programs, and so forth.

The storage unit 33 according to the present embodiment stores various data such as a medical image processing apparatus program 44 and medical image processing apparatus data 45. The medical image processing apparatus program 44 or the medical image processing apparatus data 45 is a program or data for implementing various functions of the medical image processing apparatus 10. The medical image processing apparatus program 44 and the medical image processing apparatus data 45 implement the functions of the medical image processing apparatus 10. The medical image processing apparatus data 45 includes a temporary storage unit 16 and a data storage unit 17 for temporarily storing or storing various data generated by the medical image processing apparatus program 44, and stores various data.

The computer constituting the medical image processing apparatus 10 may be a purpose-designed apparatus, a general-purpose server apparatus, a personal computer (PC), or the like. It is sufficient that the functions of the medical image processing apparatus 10 be implemented. The medical image processing apparatus 10 may be a stand-alone computer or may share a computer with an apparatus having another function. For example, the medical image processing apparatus 10 may share a computer with an apparatus having another function, such as a processor apparatus for an endoscope, or the functions of the medical image processing apparatus 10 or the computer may be incorporated into an endoscope management system or the like. In the present embodiment, the computer constituting the medical image processing apparatus 10 also serves as a PC that performs an image recognition process on a medical image.

The medical image processing apparatus 10 according to the present embodiment is a processor apparatus including a processor. A program regarding medical image processing is stored in the storage unit 33, which is a program memory, in the medical image processing apparatus 10. In the medical image processing apparatus 10, a program in the program memory is operated by the control unit 31 constituted by a processor or the like, thereby implementing the functions of the medical image acquiring unit 11, the recognition processing unit 12, the display control unit 13, the inappropriate region detecting unit 14, and the reporting control unit 15 (see FIG. 1).

The medical image acquiring unit 11 acquires a medical image from an apparatus capable of outputting a medical image. The medical image that is acquired may be an examination moving image mainly acquired in an examination. In the present embodiment, an endoscopic image acquired in an endoscopic examination using the endoscope apparatus 18 is acquired in real time during the examination. An endoscopic image is a kind of medical image and is an image acquired by imaging a subject by using an endoscope included in the endoscope apparatus 18. Hereinafter, a description will be given of a case where an endoscopic image is used as a medical image. An endoscopic image includes a moving image and/or a still image. The moving image includes individual frame images captured by the endoscope apparatus 18 in a preset number of frames.

The recognition processing unit 12 performs an image recognition process on the endoscopic image acquired by the medical image acquiring unit 11. In the present embodiment, the image recognition process includes detecting a region of interest such as a lesion in real time during an examination in an endoscopic image acquired by the medical image acquiring unit 11. Thus, in the present embodiment, the image recognition process is a region-of-interest detection process. In addition to the region-of-interest detection process, it is possible to perform a classification process of classifying the type of disease for a lesion, an area recognition process of recognizing information about an area that is being imaged, or a process of performing these processes in combination.

Figure 3:
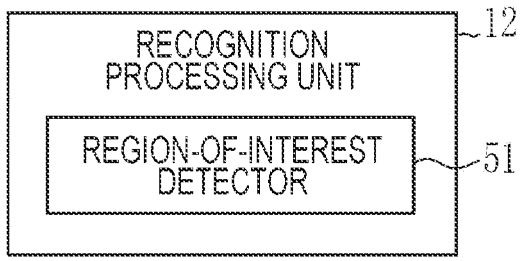
FIG. 3 is a block diagram illustrating a function of a recognition processing unit.

As illustrated in FIG. 3, the recognition processing unit 12 includes a region-of-interest detector 51. The region-of-interest detector 51 performs, based on an acquired endoscopic image 61, a region-of-interest detection process of detecting a region of interest included in a subject in the endoscopic image 61.

Figure 4A:
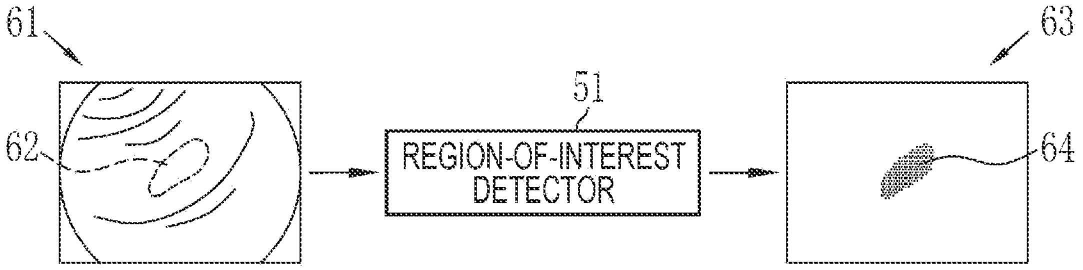
FIG. 4A is an explanatory diagram describing a process of displaying a region of interest detected by a region-of-interest detector by the shape of the region of interest.
Figure 4B:
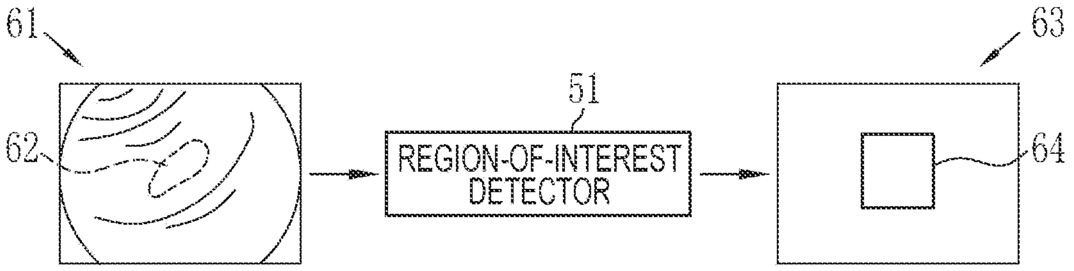
FIG. 4B is an explanatory diagram describing a process of displaying a region of interest detected by the region-of-interest detector by the shape of a rectangle.

The region-of-interest detection process is performed using the region-of-interest detector 51. As illustrated in FIG. 4A, when the endoscopic image 61 is input to the region-of-interest detector 51 and a subject in the endoscopic image 61 includes a region of interest 62, the region-of-interest detector 51 outputs a recognition process result 63 including the presence or absence of the region of interest 62 or the position of the region of interest 62. The output of the recognition process result 63 is implemented by, for example, displaying an image of a detected region of interest 64, which is the region of interest 62 detected by the recognition process. As illustrated in FIG. 4B, the output of the recognition process result 63 may be an output indicating the position of the detected region of interest 64 instead of an output of the detected region of interest 64. For example, the output of the recognition process result 63 is implemented by displaying a rectangular figure indicating the detected region of interest 64. The recognition process result 63 is output in various forms, such as an image, a figure, or text, and is thereby reported to a doctor.

The region-of-interest detector 51 may detect a region of interest by image processing, or may detect a region of interest by using a learning model that is based on machine learning. In the present embodiment, the region-of-interest detector 51 is a region-of-interest detecting learning model constructed using a machine learning algorithm, and is a learning model capable of outputting, when the endoscopic image 61 is input to the region-of-interest detector 51, the presence or absence of a region of interest in the endoscopic image 61 as an objective variable. The region-of-interest detecting learning model is an example of an image recognizing learning model. The region-of-interest detector 51 has been trained in advance by using a machine learning algorithm and an initial image data set for the region-of-interest detector 51 composed of the endoscopic image 61 and correct answer data of a region of interest, and has had its parameters and the like adjusted, so as to be capable of outputting, as an objective variable, the presence or absence of a region of interest in the endoscopic image 61.

Any of various algorithms used in supervised learning may be used as a machine learning algorithm used in the region-of-interest detector 51. Preferably, an algorithm that is to output a favorable inference result in image recognition is used. For example, it is preferable to use a multilayer neural network or a convolutional neural network, and it is preferable to use a method called deep learning. The region-of-interest detector 51 may employ techniques of processing the endoscopic image 61 serving as an input image, using a plurality of learning models, and so forth, which are typically performed to improve the performance of a learning model, for example, to improve the detection accuracy of a region of interest or increase the detection speed.

A detection result of a region of interest, which is the recognition process result 63, includes the location, size or area, shape, number, or the like of the region of interest detected in the endoscopic image 61, and also includes information indicating that the location, size, or the like of a region of interest is 0, that is, no region of interest has been detected.

The display control unit 13 performs control to display the endoscopic image 61 and the recognition process result 63 on the display 20. A method for displaying the endoscopic image 61 and the recognition process result 63 may be a method enabling a doctor to check the endoscopic image 61 and the recognition process result 63. For example, the endoscopic image 61 may be displayed such that the recognition process result 63 is superimposed thereon, the endoscopic image 61 may be displayed in a main region of the display 20 and the recognition process result 63 may be displayed in a sub-region of the display 20, or the recognition process result 63 may be presented in text. An appropriate method for displaying the endoscopic image 61 and the recognition process result 63 can be used in accordance with the details of the recognition process performed by the recognition processing unit 12, the contents of the recognition process result 63, or the like.

Figure 5:
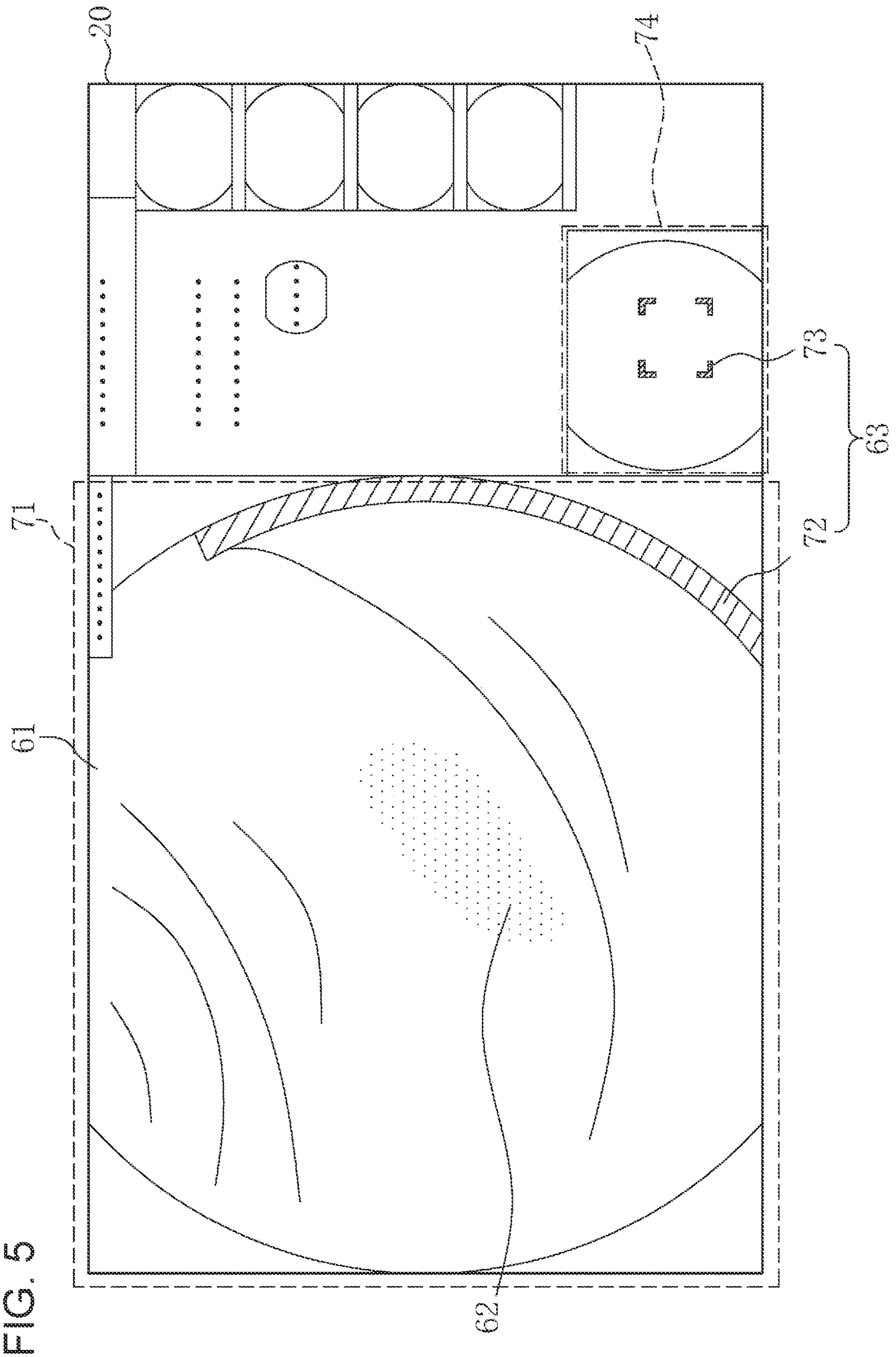
FIG. 5 is an image diagram illustrating an endoscopic image and a result of a recognition process serving as a detection process that are displayed.

As illustrated in FIG. 5, in the present embodiment, the recognition processing unit 12 performs a region-of-interest detection process and thus displays the endoscopic image 61 and a result of the region-of-interest detection process, which is the recognition process result 63, in a main region 71 of the display 20 that is used during an examination using the endoscope apparatus 18. When the endoscopic image 61 includes the region of interest 62, the doctor is able to check the region of interest 62 of the subject by displaying the endoscopic image 61.

The recognition process result 63 can be displayed in the main region 71, for example, as a detected region-of-interest indication frame 72, with the shape and color of the frame of the endoscopic image 61 near the detected region of interest 62 being different from those of a normal frame. In addition, the position of the detected region of interest 62 can be indicated by displaying, in a sub-region 74 of the display 20, a detected region-of-interest indication FIG. 73, which is a figure indicating the position of the detected region of interest 62.

By viewing the main region 71 or the sub-region 74 of the display 20, the doctor is able to recognize that the region of interest 62 has been detected by the recognition processing unit 12. The detected region-of-interest indication frame 72 or the detected region-of-interest indication FIG. 73 indicating the recognition process result 63 enables the doctor to use the recognition process result 63 for making a diagnosis. An examination moving image including the endoscopic image 61 during an examination and data such as the recognition process result 63 are stored in the temporary storage unit 16.

Figure 6:
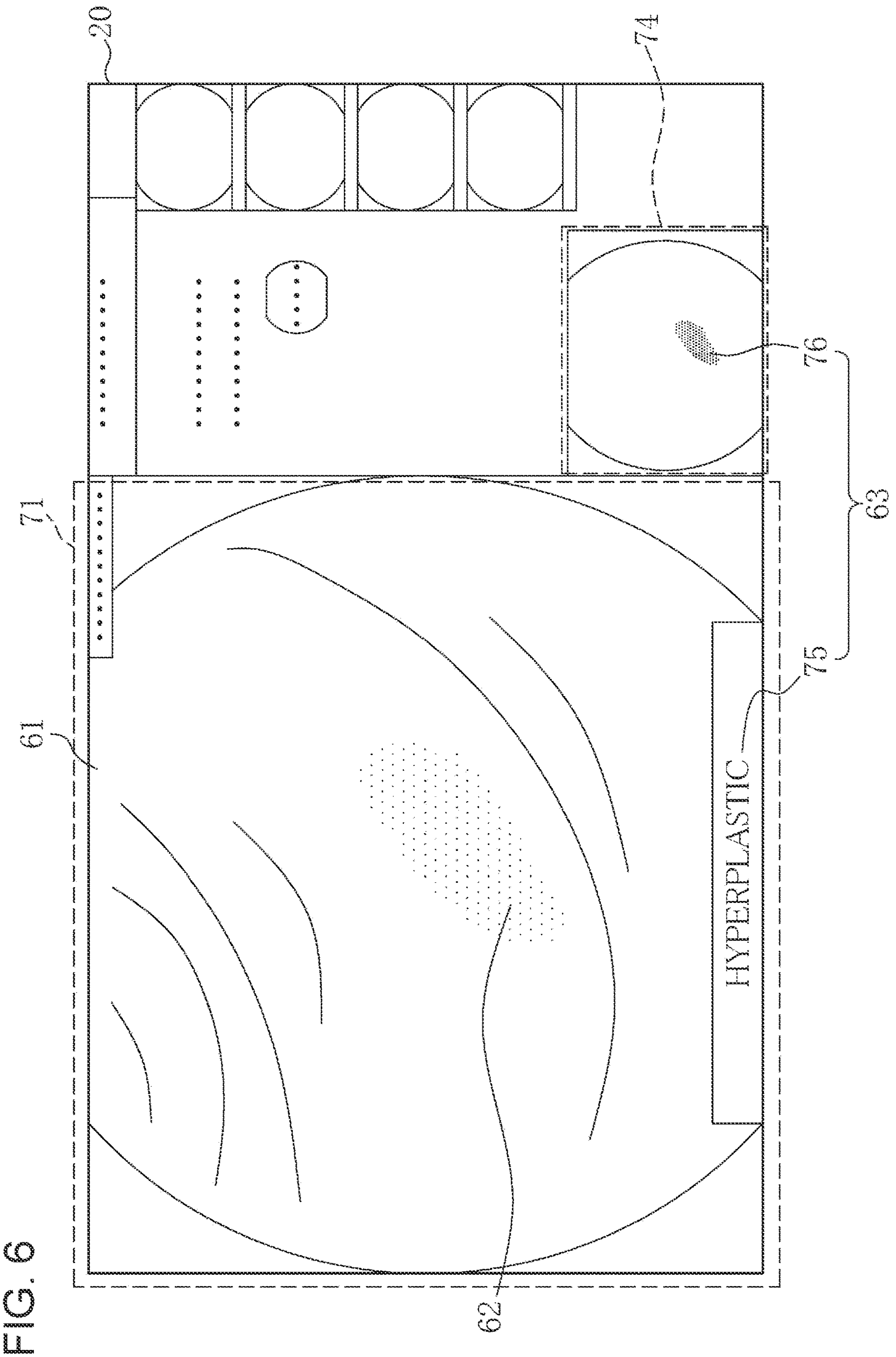
FIG. 6 is an image diagram illustrating an endoscopic image and a result of a recognition process serving as a classification process that are displayed.

For example, in a case where the recognition processing unit 12 performs a classification process of classifying the type of disease on a lesion and where the endoscopic image 61 and a result of the classification process which is the recognition process result 63 are displayed on the display 20 that is used during an examination using the endoscope apparatus 18, the endoscopic image 61 and the recognition process result 63 are displayed in the main region 71 of the display 20 that is used during the examination, and the recognition process result 63 is displayed also in the sub-region 74 of the display 20, as illustrated in FIG. 6. In the classification process, the position of a lesion in the endoscopic image 61 is detected, and the type of the lesion is classified. The recognition process result 63 displayed in the main region 71 is a classification result indication text 75. Specifically, text such as "HYPERPLASTIC" is displayed. In the sub-region 74, a color-based classification result indication 76 is displayed as the recognition process result 63, in which the position and type of a lesion are displayed in a color indicating the type of the lesion. In FIG. 6, the color-based classification result indication 76 indicates that the lesion is hyperplastic.

Figure 7:
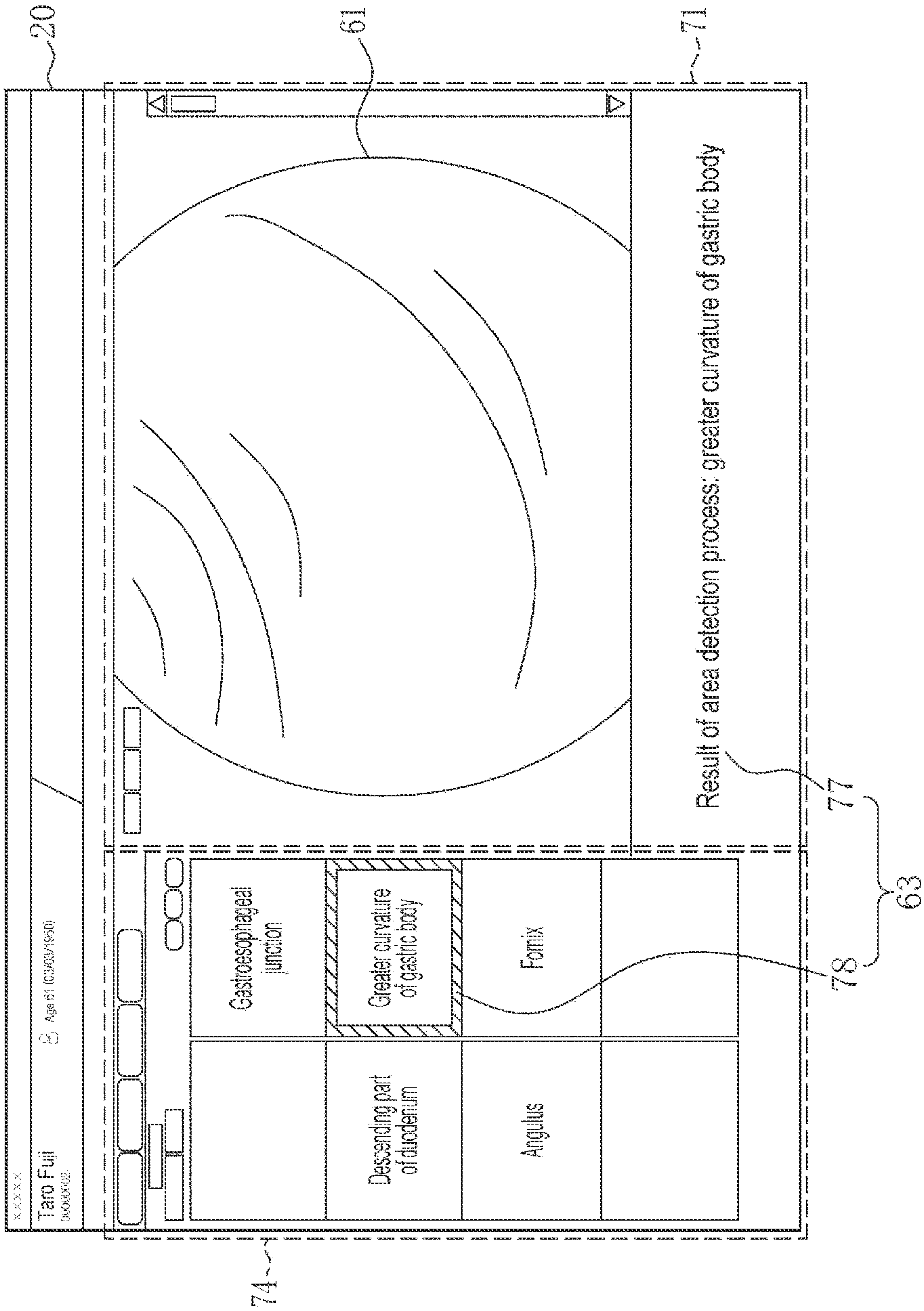
FIG. 7 is an image diagram illustrating an endoscopic image and a result of a recognition process serving as an area recognition process that are displayed.

In addition, for example, in a case where the recognition processing unit 12 performs an area recognition process or the like of recognizing information about an area, and where after an examination using the endoscope apparatus 18, the endoscopic image 61 and a result of the area recognition process, which is the recognition process result 63, are displayed in the main region 71 in examination report creation software of the display 20 for creating an examination report, the endoscopic image 61 and an area name indication text 77 are displayed in the main region 71, and the recognition process result 63 is displayed in the sub-region 74 by an area-name-tile emphasized indication 78, for example, as illustrated in FIG. 7.

The inappropriate region detecting unit 14 performs, based on the endoscopic image 61, an inappropriate region detection process. In the inappropriate region detection process, an inappropriate region, which is a region inappropriate for an image recognition process, is output as an inappropriate region detection result 82. In the present embodiment, an inappropriate region, which is a region inappropriate for a region-of-interest detection process, is detected as the inappropriate region detection result 82. Specifically, an inappropriate region is a region in the endoscopic image 61 and is a region that is not likely to be subjected to an appropriate region-of-interest detection process due to the endoscopic image 61. The inappropriate region detection process specifies the position of an inappropriate region in the endoscopic image 61. Thus, the inappropriate region detection result 82 includes the position of the inappropriate region in the endoscopic image 61.

In the inappropriate region detection process, it is only necessary to detect a region that is not likely to be subjected to an appropriate region-of-interest detection process in the endoscopic image 61. For example, a method of using a learning model based on machine learning, a method of detecting an inappropriate region by identifying an inappropriate factor, which is a factor responsible for the inappropriate region, through image processing, or the like can be adopted. In the present embodiment, a learning model based on machine learning is used. The case of identifying an inappropriate factor by image processing will be described below.

Figure 8:
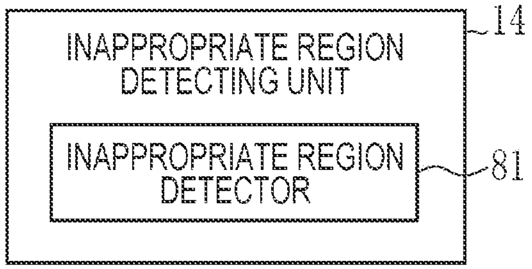
FIG. 8 is a block diagram illustrating a function of an inappropriate region detecting unit.

As illustrated in FIG. 8, the inappropriate region detecting unit 14 includes an inappropriate region detector 81. The inappropriate region detector 81 is an inappropriate region detecting learning model for detecting, based on the endoscopic image 61 that has been acquired, a region inappropriate for a region-of-interest detection process.

Figure 9A:
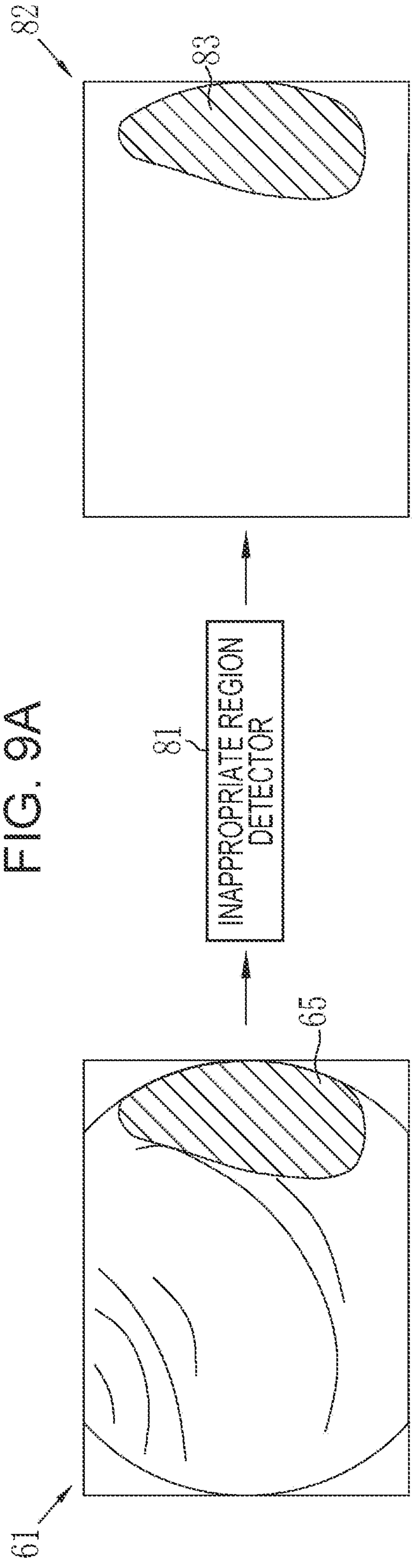
FIG. 9A is an explanatory diagram describing an inappropriate region which is a halation portion detected by an inappropriate region detector.

As illustrated in FIG. 9A, when the endoscopic image 61 is input to the inappropriate region detector 81 and a subject in the endoscopic image 61 includes a region inappropriate for a region-of-interest detection process, the region-of-interest detector 81 outputs the inappropriate region detection result 82. In FIG. 9A, the endoscopic image 61 includes a halation region 65. The halation region 65 has pixel values that are in a saturated state or a nearly saturated state in the endoscopic image 61. Thus, the recognition processing unit 12 is incapable of performing an image recognition process by using the feature quantities of pixels, and is incapable of appropriately performing a region-of-interest detection process based the halation region 65. Upon detecting the halation region 65 in response to input of the endoscopic image 61 including the halation region 65, the inappropriate region detector 81 outputs the inappropriate region detection result 82 including a detected inappropriate region 83 of the halation region 65. The inappropriate region detection result 82 may or may not include the detected inappropriate region 83 detected by the region-of-interest detection process.

Figure 9B:
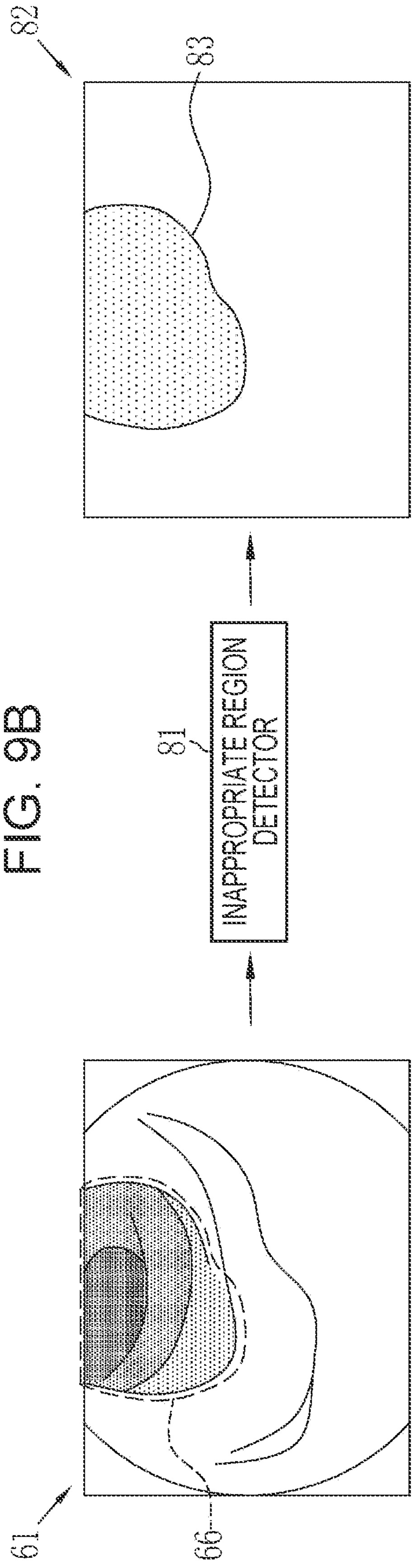
FIG. 9B is an explanatory diagram describing an inappropriate region which is a dark portion detected by the inappropriate region detector.

As illustrated in FIG. 9B, the endoscopic image 61 includes a dark region 66, which is the back of a lumen that the illumination light of the endoscope does not reach. The dark region 66 has pixel values that are 0 or close to 0 in the endoscopic image 61. Thus, the recognition processing unit 12 is incapable of performing an image recognition process by using the feature quantities of pixels, and is incapable of appropriately performing a region-of-interest detection process based on the dark region 66. Thus, the inappropriate region detector 81 outputs, in response to input of the endoscopic image 61 including the dark region 66, the inappropriate region detection result 82 including the detected inappropriate region 83 of the dark region 66.

The inappropriate region detector 81 is specifically an inappropriate region detecting learning model constructed using a machine learning algorithm, and is a learning model capable of outputting, in response to the endoscopic image 61 being input to the inappropriate region detector 81, the presence or absence of an inappropriate region in the endoscopic image 61 as an objective variable. The inappropriate region detector 81 has been trained in advance by using a machine learning algorithm and an initial image data set for the inappropriate region detector 81 composed of the endoscopic image 61 and correct answer data of an inappropriate region, and has had its parameters and the like adjusted, so as to be capable of outputting, as an objective variable, the presence or absence of an inappropriate region in the endoscopic image 61.

Any of various algorithms used in supervised learning may be used as a machine learning algorithm used in the inappropriate region detector 81. Preferably, an algorithm that is to output a favorable inference result in image recognition is used. For example, it is preferable to use a multilayer neural network or a convolutional neural network, and it is preferable to use a method called deep learning. The inappropriate region detector 81 may employ techniques of processing the endoscopic image 61 serving as an input image, using a plurality of learning models, and so forth, which are typically performed to improve the performance of a learning model, for example, to improve the detection accuracy of an inappropriate region or increase the detection speed.

The inappropriate region detection result 82 includes the location, size or area, shape, number, or the like of an inappropriate region detected in the endoscopic image 61, and also includes information indicating that the location, size, or the like of an inappropriate region is 0, that is, no inappropriate region has been detected.

Based on the inappropriate region detection result 82, the reporting control unit 15 performs control to report this. A method for controlling reporting can be set in advance. For example, when the inappropriate region detection result 82 indicates that no inappropriate region has been detected, reporting is not performed, whereas when an inappropriate region has been detected, reporting is performed to notify the doctor of the fact.

Any reporting method may be used as long as the doctor is able to recognize that the endoscopic image 61 includes a region inappropriate for a region-of-interest detection process. Thus, a method of using reporting means that allows the doctor to perform recognition by his/her five senses can be employed for reporting.

Specifically, the inappropriate region detection result 82 indicating that an inappropriate region has been detected can be reported using an image displayed on the display 20. During an examination using the endoscope apparatus 18, the display 20 that displays the inappropriate region detection result 82 is preferably the same as the display 20 that displays the endoscopic image 61 during the examination. As a result of displaying the inappropriate region detection result 82 on the display 20, the doctor is able to check the inappropriate region detection result 82 by performing an operation that is not different from an operation in a usual examination. In the case of reporting using an image, the reporting control unit 15 issues a reporting instruction to the display control unit 13, and the display control unit 13 performs specific display control.

When the inappropriate region detection result 82 indicating that an inappropriate region has been detected is acquired, vibration generation means may be used to perform reporting by vibration. As the vibration generation means, a small terminal, a mobile phone, a smartphone, or the like capable of generating vibration through communication can be employed. When the inappropriate region detection result 82 indicating that an inappropriate region has been detected is acquired, sound generation means such as a speaker may be used to perform reporting by sound including a sound and/or a voice. Use of the sound generation means or vibration generation means in the reporting of the inappropriate region detection result 82 enables the doctor to make display on the display 20 to be the same as in a usual examination or the like.

In the present embodiment, the reporting control unit 15 performs, on the display 20, control of making a report by displaying the inappropriate region detection result 82 as an image. For example, the display 20 includes the main region 71 and the sub-region 74, and displays the endoscopic image 61 in the main region 71. The sub-region 74 displays a position map indicating a position in the endoscopic image 61. The inappropriate region detection result 82 obtained by a detection process is displayed on the position map. In the main region 71 and/or the sub-region 74, the result 63 of a recognition process, which is a process of detecting a region of interest, may be displayed.

Figure 10:
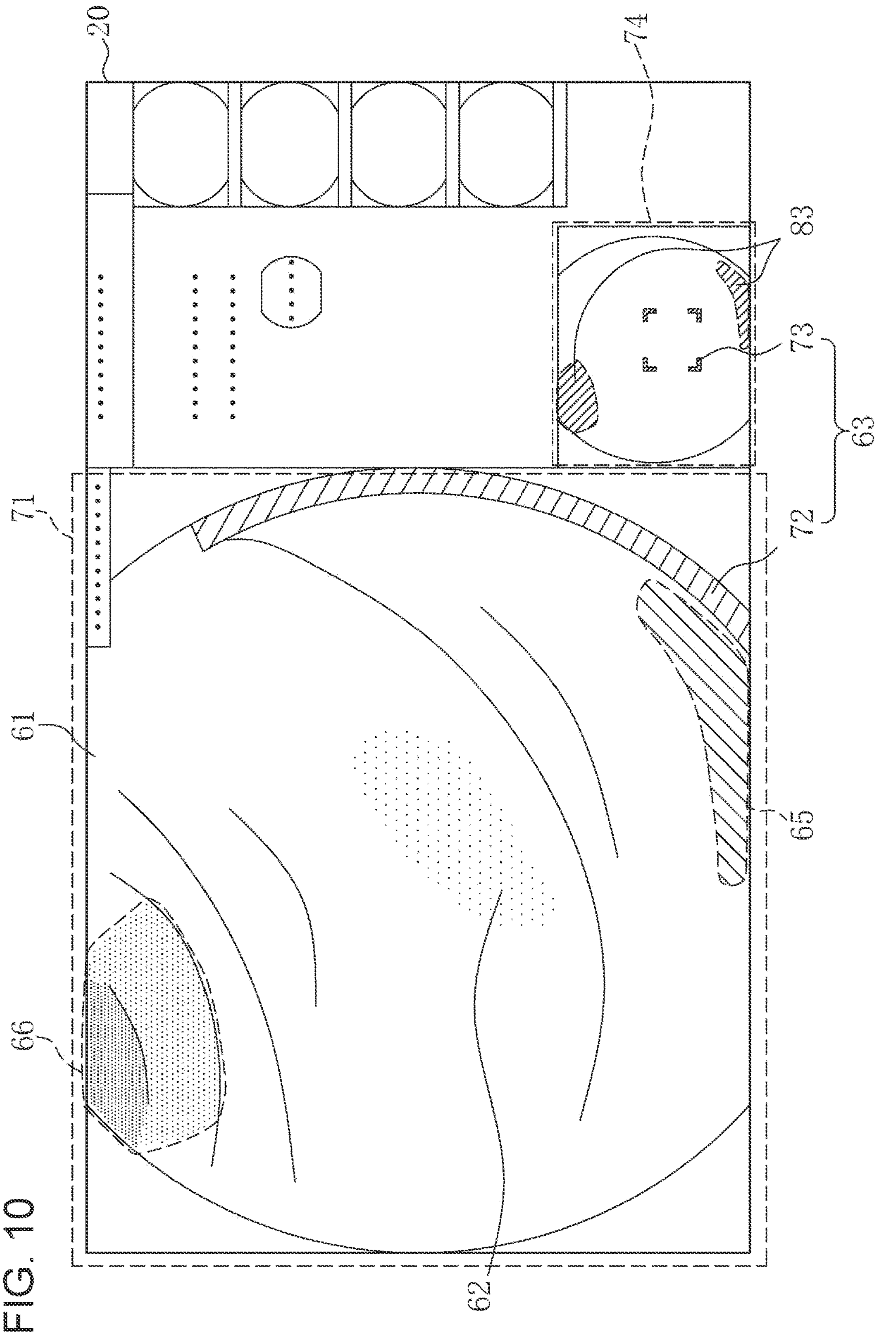
FIG. 10 is an image diagram illustrating an endoscopic image, a result of a detection process, and a result of an inappropriate region detection process that are displayed in a sub-region.

As illustrated in FIG. 10, during an examination, the endoscopic image 61 and the region of interest 62, which is the recognition process result 63 and indicated by the detected region-of-interest indication frame 72, are displayed in the main region 71. On the position map in the sub-region 74, the detected inappropriate region 83 and the detected region-of-interest indication FIG. 73, which is the recognition process result 63, are displayed. The endoscopic image 61 includes the halation region 65 that appears white and the dark region 66 that appears dark. Because the inappropriate region detection result 82 includes the halation region 65 and the dark region 66, the position map shown in the sub-region 74 indicates that these regions are detected inappropriate regions 83. As a result of displaying the recognition process result 63 and the inappropriate region detection result 82 in the main region 71 and the sub-region 74, the doctor is able to grasp the inappropriate region detection result 82 and so forth while observing a subject under an examination by viewing the display 20 to check the recognition process result 63 of the endoscopic image 61 during the examination. Thus, as a result of displaying the inappropriate region detection result 82 in the sub-region 74, the display in the main region 71 need not be changed from that in a usual examination, and the observation of the endoscopic image 61 by the doctor is not hindered.

Figure 11:
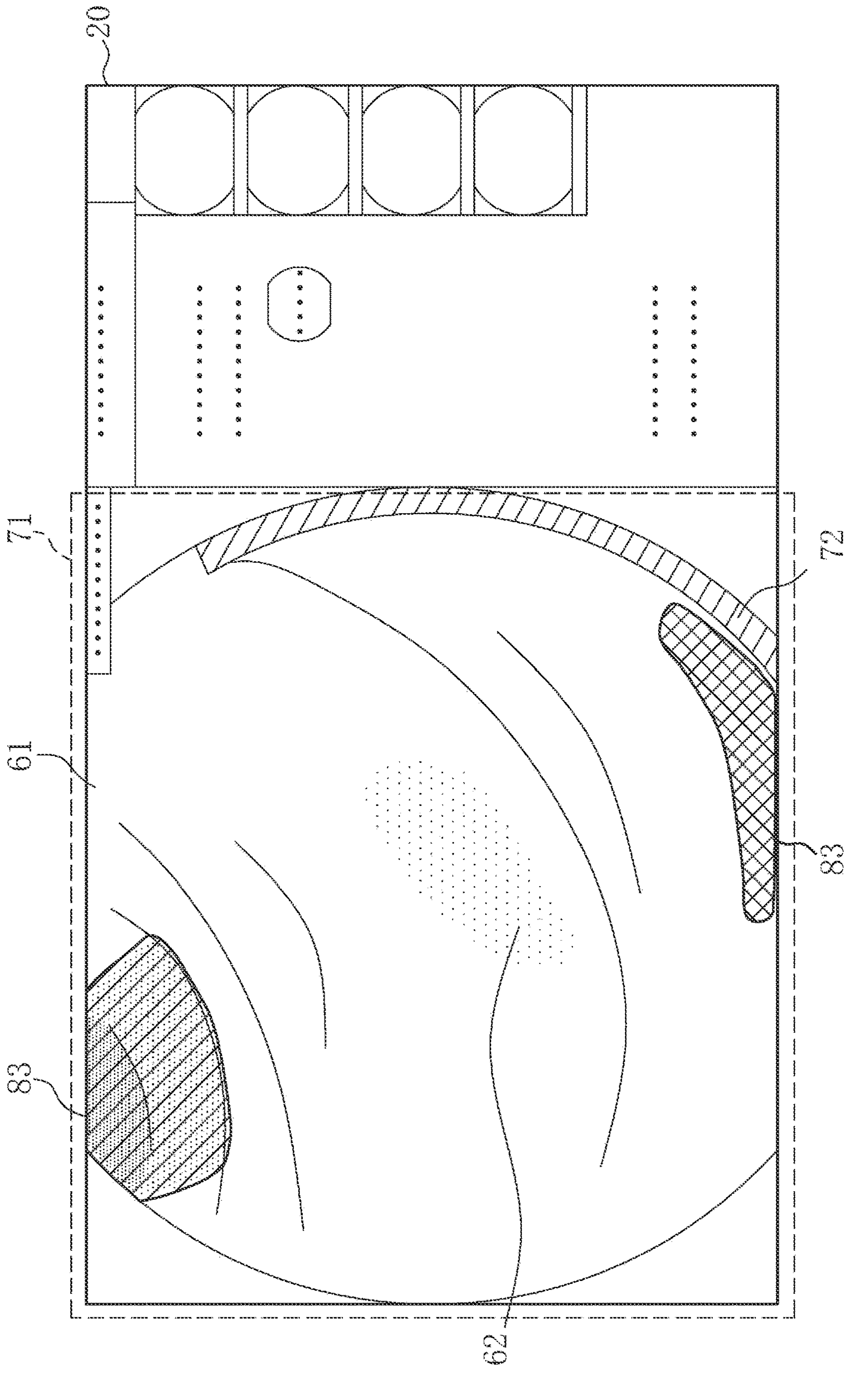
FIG. 11 is an image diagram illustrating an endoscopic image, a result of a detection process, and a result of an inappropriate region detection process that are displayed in a main region.

Alternatively, the inappropriate region detection result 82 may be superimposed on the endoscopic image 61 and displayed on the display 20. As illustrated in FIG. 11, the endoscopic image 61 and the detected inappropriate regions 83 may be displayed in a superimposed manner. The recognition process result 63 may be further displayed in a superimposed manner. In this case, it is preferable to display the inappropriate region detection result 82 and the recognition process result 63 in different manners, for example, by displaying the inappropriate region detection result 82 as the detected inappropriate regions 83 and displaying the recognition process result 63 as the detected region-of-interest indication frame 72. As a result of displaying the inappropriate region detection result 82 and so forth in a superimposed manner on the endoscopic image 61, the doctor is able to grasp the inappropriate region detection result 82 and so forth while observing a subject by viewing the display 20 to check the endoscopic image 61 during an examination, even when the display 20 does have the sub-region 74.

As described above, the medical image processing apparatus 10 performs control to report the inappropriate region detection result 82, and reports the inappropriate region detection result 82 to a doctor or the like. Accordingly, the doctor is able to recognize, in the endoscopic image 61, a region inappropriate for an image recognition process, regardless of a result of the image recognition process such as a region-of-interest detection process in the endoscopic image 61. For example, an inappropriate region is detected not only when a region of interest is detected by a region-of-interest detection process but also when a subject is composed of a normal region not including a lesion or the like and a region of interest is not detected, or when erroneous detection is performed in the region-of-interest detection process. Even when an image recognition process is incapable of detecting a lesion of a subject, an inappropriate region is detected and reported, and then a lesion is highly likely to be detected.

Furthermore, the inappropriate region detection result 82 includes a region that is problematic for performing an image recognition process, even in the endoscopic image 61 that seems to be less problematic when visually recognized by a person. That is, a region for which a determination result made by a doctor and a determination result obtained in an image recognition process are different from each other regarding an inappropriate region can be reported as an inappropriate region to the doctor. These reports enable the doctor to perform, for example, in an examination using an endoscope, various operations including operating the endoscope so as not to generate an inappropriate region, such as correcting a blur or unsharpness that may cause an inappropriate region, removing lens dirt, or adjusting a magnification ratio or a distance to a subject. Thus, the doctor is able to suppress the occurrence of an inappropriate region, and is also able to capture the endoscopic image 61 on which a region-of-interest detection process is appropriately performed. As described above, the medical image processing apparatus 10 is capable of acquiring a more reliable or more accurate image recognition process result by an appropriate image recognition process.

In the case of providing a report by displaying the inappropriate region detection result 82 on the display 20, the doctor is able to acquire information such as the inappropriate region detection result 82 in addition to the endoscopic image 61 by viewing the display 20 for checking a subject during an examination.

Next, an inappropriate factor will be described. The inappropriate region detecting unit 14 may perform, based on the endoscopic image 61, an inappropriate factor identification process of identifying an inappropriate factor, which is a reason why an inappropriate region is inappropriate for an image recognition process. In this case, the reporting control unit 15 performs, based on an identification result of the inappropriate factor identification process, control to report the identification result. As described above, there may be a plurality of types of inappropriate factors. In the inappropriate factor identification process, the inappropriate factor of each inappropriate region in the endoscopic image 61 is identified to be any one of a plurality of types of inappropriate factors.

For example, in the case of evaluating and reporting only the risk of overlooking a lesion or the like by an image recognition process, the risk of overlooking a lesion or the like is reported, but the factor of the risk of overlooking a lesion or the like is not reported to a doctor. Thus, the doctor may be unable to recognize these risks. Thus, it may be impossible to perform an operation of avoiding these risks. The medical image processing apparatus 10 is capable of identifying and reporting an inappropriate factor, and enables a doctor to perform an operation of removing the inappropriate factor. Removing of the inappropriate factor increases the possibility that an image recognition process is appropriately performed.

In addition, identifying and reporting of an inappropriate factor for an inappropriate region makes it possible to explain a detection result obtained by a learning model for detecting the inappropriate region, which eliminates the inconvenience involved in employing machine learning, such as a reason regarding the detection result being unclear, and leads to use of more useful machine learning.

Figure 12:
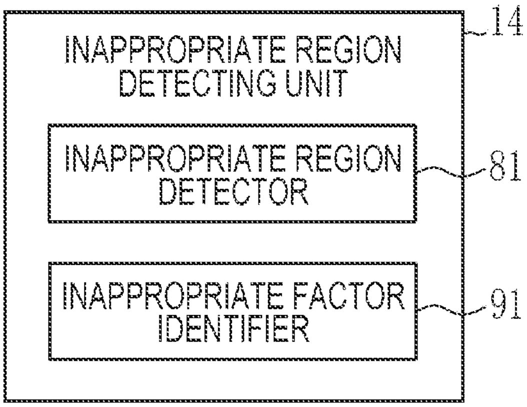
FIG. 12 is a block diagram illustrating functions of the inappropriate region detecting unit including an inappropriate factor identifier.

The inappropriate factor identification process may be, for example, a method of using a learning model based on machine learning, a method of identifying an inappropriate factor by image processing, or the like. As illustrated in FIG. 12, in the case of using a learning model, the inappropriate region detecting unit 14 includes the inappropriate factor identifier 91. The inappropriate factor identifier 91 performs an inappropriate factor identification process of identifying an inappropriate factor for an inappropriate region detected by the inappropriate region detector 81. When a plurality of inappropriate regions are detected, inappropriate factors are identified for the respective inappropriate regions.

Figure 13A:
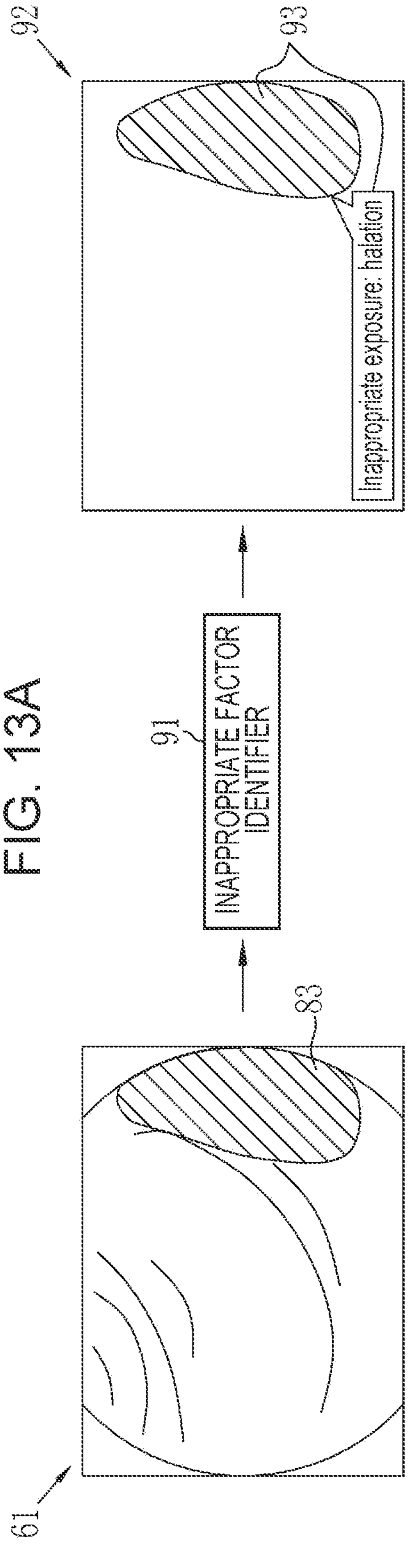
FIG. 13A is an explanatory diagram describing an inappropriate factor which is a halation portion detected by the inappropriate factor identifier.
Figure 13B:
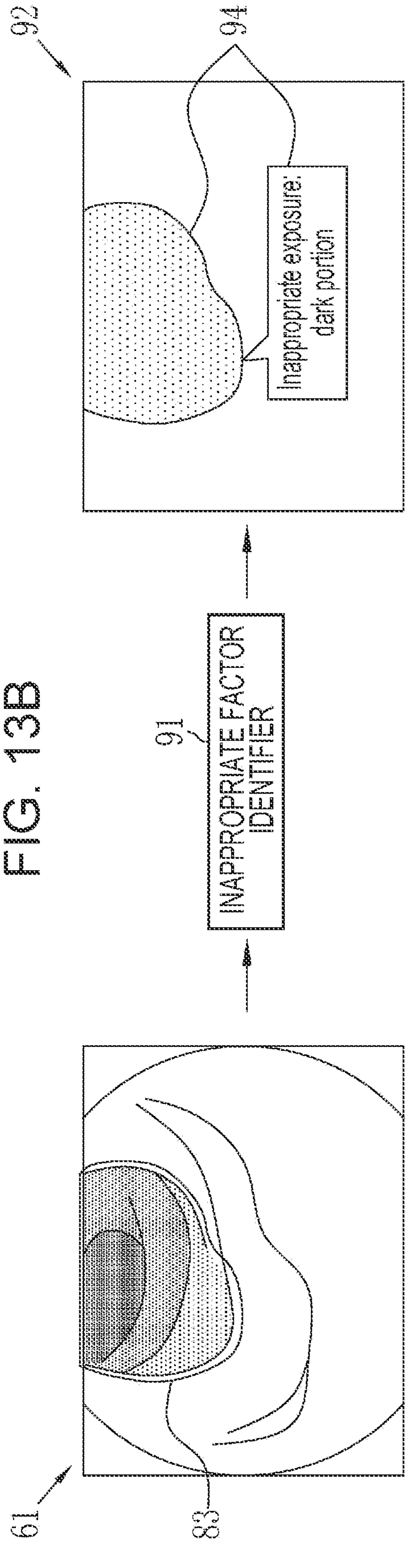
FIG. 13B is an explanatory diagram describing an inappropriate factor which is a dark portion detected by the inappropriate factor identifier.

As illustrated in FIG. 13A, in response to input of the endoscopic image 61 having the detected inappropriate region 83, which is the halation region 65, the inappropriate factor identifier 91 identifies an inappropriate factor in the detected inappropriate region 83 and outputs an inappropriate factor identification result 92. The inappropriate factor identification result 92 is output as a halation region identification result 93 by displaying a region and/or using text such as "Inappropriate exposure: halation". Similarly, as illustrated in FIG. 13B, in response to input of the endoscopic image 61 having the detected inappropriate region 83, which is the dark region 66, the inappropriate factor identifier 91 identifies an inappropriate factor in the detected inappropriate region 83 and outputs an inappropriate factor identification result 92. The inappropriate factor identification result 92 is output as a dark region identification result 94 by displaying a region and/or using text such as "Inappropriate exposure: dark portion". The output of the inappropriate factor identification result 92 is displayed in the sub-region 74 or the like of the display 20.

The inappropriate factor identifier 91 is an inappropriate factor identifying learning model constructed by using a machine learning algorithm, and is a learning model capable of, in response to information about an inappropriate region in the endoscopic image 61 being input to the inappropriate factor identifier 91, identifying an inappropriate factor of the input inappropriate region and outputting the inappropriate factor as an objective variable. The inappropriate factor identifier 91 is trained or adjusted so as to be capable of outputting, as an objective variable, an inappropriate factor of an inappropriate region in the endoscopic image 61.

Any of various algorithms used in supervised learning may be used as a machine learning algorithm used in the inappropriate factor identifier 91. Preferably, an algorithm that is to output a favorable inference result in image recognition is used. For example, it is preferable to use a multilayer neural network or a convolutional neural network, and it is preferable to use a method called deep learning.

A result output from the inappropriate factor identifier 91 may be percentages of a plurality of items. In this case, a plurality of inappropriate factors are output in the respective probabilities. Specifically, in the case of performing deep learning using a convolutional neural network as an algorithm, a method such as using a softmax function as an activation function is performed. Accordingly, the inappropriate factor identifier 91 outputs the probabilities of a plurality of inappropriate factors, and a final inappropriate factor can be determined in consideration of these inappropriate factors. The inappropriate factor identifier 91 may employ techniques of processing the endoscopic image 61 serving as an input image, using a plurality of learning models, and so forth, which are typically performed to improve the performance of a learning model, for example, to improve the identification accuracy of an inappropriate factor or increase the identification speed. The inappropriate factor identification result 92 includes the details of the inappropriate factor for which an inappropriate region has been identified, and also includes a result indicating that an inappropriate factor is unknown.

The inappropriate factor identifier 91 is trained by using a learning data set including the endoscopic image 61 having an inappropriate region and correct answer data of an inappropriate factor in the inappropriate region. Correct answer data of an inappropriate factor can be acquired by assigning, by a doctor or the like, the details of the inappropriate factor, such as unsharpness, blur, or halation, to a corresponding inappropriate region generated by unsharpness, blur, or halation as described above. In a case where an inappropriate factor is that a correct diagnosis rate calculated based on a result of an image recognition process is lower than or equal to a preset threshold value, the correct diagnosis rate calculated based on a result of an image recognition process, such as a detection process, performed on the endoscopic image 61 can be used as correct answer data.

A doctor is able to determine the recognition process result 63, such as a result of a detection process performed on the endoscopic image 61, and assign a correct diagnosis rate to each region of the endoscopic image 61. For example, the doctor assigns numerical values in stages from 0 to 100, for example, assigns 100 when the recognition process result 63 is entirely the same as the diagnosis made by the doctor or assigns 0 when the recognition process result 63 is entirely different from the diagnosis made by the doctor. Accordingly, the endoscopic image 61 having correct diagnosis rates as correct answer data can be used as a learning data set. As a result of inputting the endoscopic image 61 having an unknown correct diagnosis rate, the inappropriate factor identifier 91 that has learned using the endoscopic image 61 having correct answer data of correct diagnosis rates is capable of outputting, as the inappropriate factor identification result 92, correct diagnosis rates estimated for individual regions of the endoscopic image 61. In a region having a high correct diagnosis rate, the degree to which the inappropriate region is inappropriate for an image recognition process is low. Thus, by using the correct diagnosis rate and identifying an inappropriate factor, it is possible to acquire not only the details of the inappropriate factor but also information about the degree of inappropriateness of the inappropriate factor.

A wrong diagnosis rate may be used as an inappropriate factor similar to the correct diagnosis rate. A wrong diagnosis rate indicates the degree of difference between a result of an image recognition process such as a detection process performed on the endoscopic image 61 and a result of diagnosis made by a doctor. For example, a wrong diagnosis rate may be, contrary to a correct diagnosis rate, the percentage at which a result of an image recognition process such as a detection process performed on the endoscopic image 61 is different from a result of a diagnosis made by a doctor on an actual situation of a subject in the endoscopic image 61, including an examination result of biopsy or the like. The wrong diagnosis rate can be used in a manner similar to that of the correct diagnosis rate. As an inappropriate factor, a region having a high wrong diagnosis rate has a high degree of inappropriateness for an image recognition process.

The reporting control unit 15 performs, based on the inappropriate factor identification result 92, control to report an identification result. The control of reporting can be set in advance. For example, in a case where the inappropriate factor identification result 92 is an inappropriate factor for an inappropriate region that is highly likely to be overlooked by a doctor and is an inappropriate factor that is easily removed by operating an endoscope, control can be performed such that reporting is actively performed or reporting is performed in a conspicuous manner. On the other hand, in a case where the inappropriate factor identification result 92 is the halation region 65 or the like and is an inappropriate factor that is highly likely to be visually recognized by a doctor, control can be performed such that reporting is not performed or reporting is performed in an inconspicuous manner.

A method for reporting can be similar to that in the region-of-interest detection process. For example, at least one of reporting of the inappropriate factor identification result 92 by an image displayed on the display 20, reporting by vibration generated by vibration generation means, or reporting by sound generated by sound generation means can be performed.

In a case where the inappropriate factor identification result 92 includes a plurality of inappropriate factors, the reporting control unit 15 may perform control to report the inappropriate factor identification result 92 in a mode that varies among the inappropriate factors. Any mode can be used as long as it is possible to recognize that the contents of reports are different from each other in individual means of reporting. For example, in a case where reporting is performed by images, colors, figures, or texts different from each other are displayed, and thereby difference between the contents of reports can be recognized. The mode can be differentiated by vibration patterns in the case of using vibration, or by sound types or sound patterns in the case of using sound.

Figure 14:
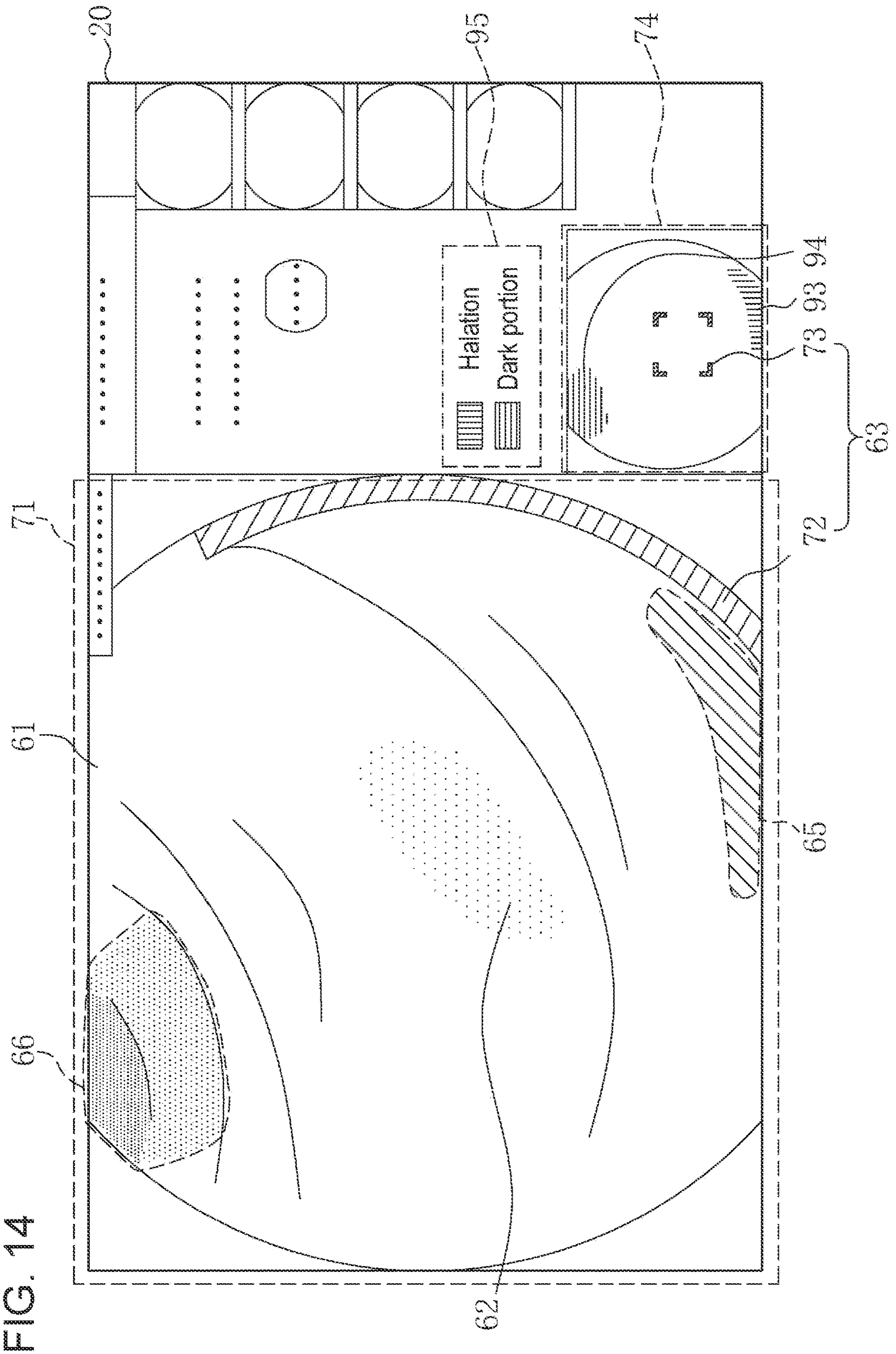
FIG. 14 is an image diagram of an image for reporting an inappropriate factor identification result obtained by the inappropriate factor identifier.

As illustrated in FIG. 14, in the case of reporting the inappropriate factor identification result 92 by an image, for example, the inappropriate factor identification result 92 can be reported by displaying the image such that the color varies according to an identified inappropriate factor. The detected inappropriate region 83 whose inappropriate factor is the halation region 65 is displayed in a color indicating the halation region identification result 93 in the position map. The detected inappropriate region 83 whose inappropriate factor is the dark region 66 is displayed in a color indicating the dark region identification result 94 in the position map. Accordingly, in this case, it is preferable to display an inappropriate factor legend 95 in which the details of inappropriate factors and the colors for display are displayed in association with each other so that the relationship between the inappropriate factors and the colors can be determined.

Reporting may be controlled in accordance with a combination of inappropriate factors. In a case where an identification result includes a plurality of inappropriate factors, that is, in a case where the endoscopic image 61 includes a plurality of inappropriate factors, the reporting control unit 15 is capable of performing, based on a composite inappropriate factor acquired by combining at least two of the plurality of inappropriate factors, control to vary the mode of reporting a detection result.

The composite inappropriate factor is a factor acquired by using individual inappropriate factors. In the case of acquiring a composite inappropriate factor by using individual inappropriate factors, the individual inappropriate factors can be weighted. For example, in a composite inappropriate factor acquired by combining an inappropriate factor of a correct diagnosis rate and another inappropriate factor, when the inappropriate factor of a correct diagnosis rate is equal to or more than a preset value, it may be unnecessary to perform reporting regardless of the other inappropriate factor. Use of the composite inappropriate factor makes it possible to control reporting in detail. An inappropriate factor in the composite inappropriate factor may be a quantified inappropriate factor. The degree of inappropriateness, which is a quantified inappropriate factor, will be described below.

Depending on the type of the inappropriate factor identifier 91, it is possible to, based on the endoscopic image 61, acquire the inappropriate factor identification result 92 by identifying an inappropriate factor and detect a region having the inappropriate factor identification result 92, that is, an inappropriate region at the same time. As a result of training a learning model by using a learning data set including the endoscopic image 61, various inappropriate factors included in the endoscopic image 61, and the regions thereof, the learning model is capable of outputting, in response to input of the endoscopic image 61, an inappropriate factor and an inappropriate region having the inappropriate factor. Thus, in this case, an inappropriate factor identification process makes it possible to simultaneously perform an inappropriate factor identification process and an inappropriate region detection process of detecting an inappropriate region.

In the inappropriate factor identification process, a method of identifying an inappropriate factor by image processing can be employed. Also in this case, the inappropriate factor identification process and the inappropriate region detection process of detecting an inappropriate region may be simultaneously performed. The inappropriate region detecting unit 14 detects each of a plurality of inappropriate factors by image processing and identifies the inappropriate factors based on detection results. The image processing operations for identifying these inappropriate factors are performed in parallel.

Figure 15:
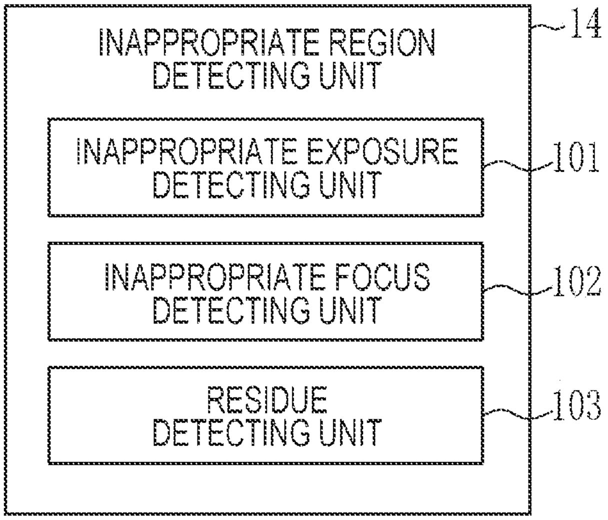
FIG. 15 is a block diagram illustrating functions of the inappropriate region detecting unit including various detecting units.

For example, in a case where inappropriate factors are inappropriate exposure, inappropriate focus such as unsharpness, and the presence of a residue, the inappropriate region detecting unit 14 includes, as illustrated in FIG. 15, an inappropriate exposure detecting unit 101 that detects inappropriate exposure, an inappropriate focus detecting unit 102 that detects unsharpness, a residue detecting unit 103 that detects the presence of a residue, and the like. In addition, a blur detecting unit that detects a blur, a dirt detecting unit that detects lens dirt and the like, or the like can be set as appropriate in accordance with an inappropriate factor to be detected. Specifically, the inappropriate exposure detecting unit 101 is capable of performing identification by using a determination algorithm that uses pixel values. The blur detecting unit or the inappropriate focus detecting unit 102 that detects unsharpness is capable of performing identification by using a determination algorithm that uses the contrast of an image. The residue detecting unit 103 is capable of performing identification by using a determination algorithm that uses pixel values because a residue has a color different from the color of the surroundings.

In the process performed in this case, the inappropriate exposure detecting unit 101, the inappropriate focus detecting unit 102, and the residue detecting unit 103, which are individual detecting units of the inappropriate region detecting unit 14, operate in parallel with each other, in parallel with the recognition processing unit 12 recognizing a region of interest for the endoscopic image 61 acquired by the medical image acquiring unit 11. A result of the recognition process performed by the recognition processing unit 12 is transmitted to the display control unit 13, and control is performed to display the result on the display 20. Detection results of the individual detecting units of the inappropriate region detecting unit 14 are transmitted to the reporting control unit 15, and reporting is performed in a preset mode.

Figure 16:
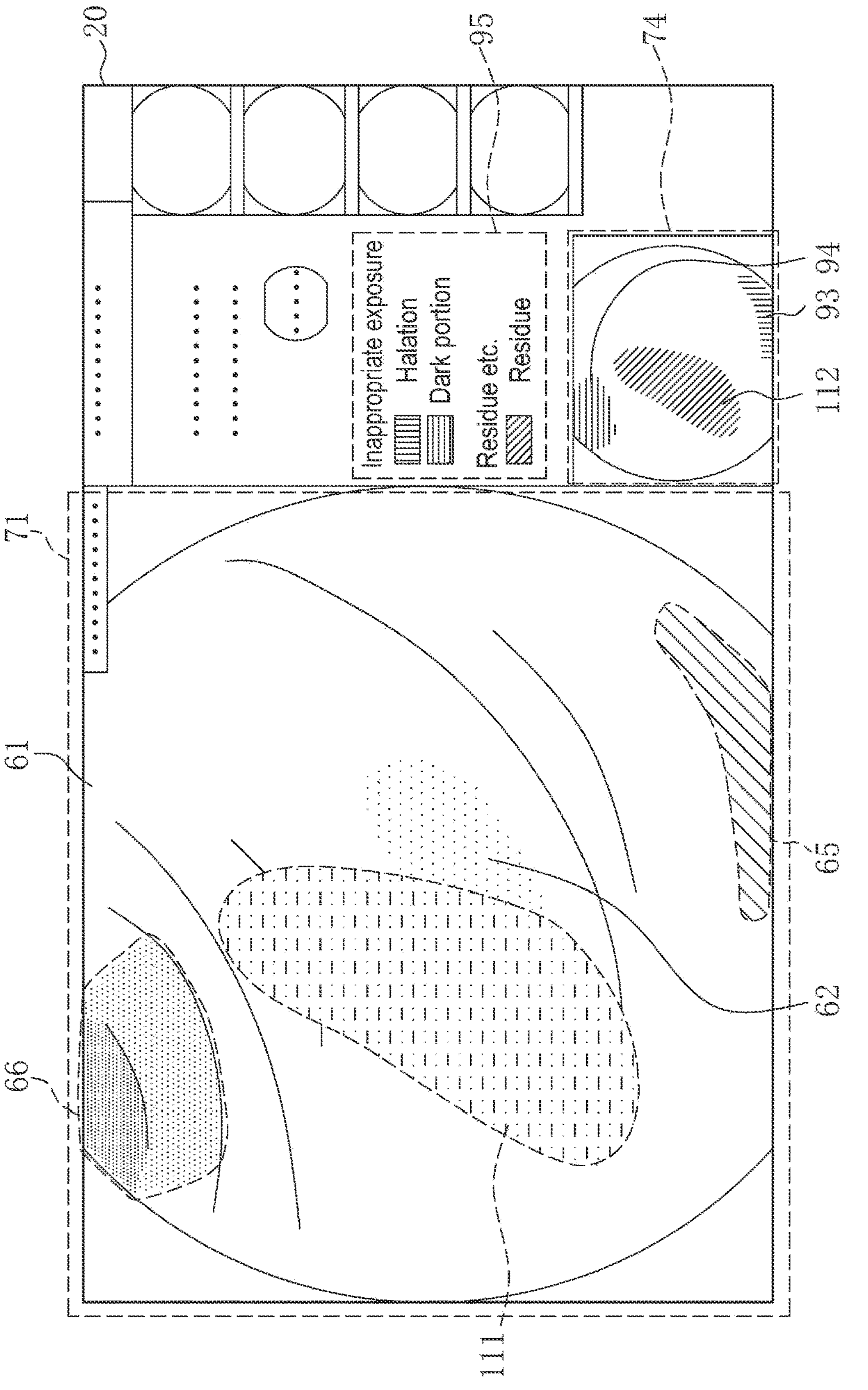
FIG. 16 is an image diagram of an image for reporting inappropriate factor identification results obtained by individual detecting units.

As illustrated in FIG. 16, in a case where the endoscopic image 61 includes the dark region 66, a residue region 111 in which a residue is present, and a halation region, and where setting is made to perform reporting by displaying the inappropriate factor identification result 92 on an image, the halation region identification result 93 and the dark region identification result 94, which are image processing results of the inappropriate exposure detecting unit 101, and a residue region identification result 112, which is an image processing result of the residue detecting unit 103, are displayed in different colors in the sub-region 74 of the display 20. FIG. 16 illustrates a case where the detected region of interest 64 is not displayed on the position map in the sub-region 74. As a result of the detected region of interest 64 not being displayed, the doctor is able to determine that the recognition processing unit 12 is unable to recognize the region of interest 62, probably because of a residue. By acquiring such information, the doctor is able to consider various operations.

Figures 17, 18:
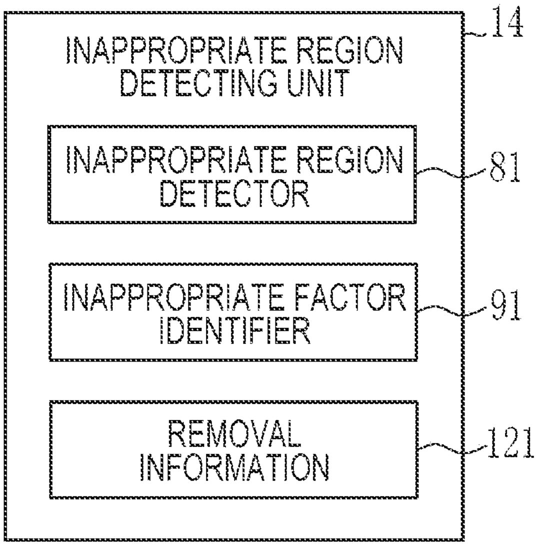
FIG. 17 is a block diagram illustrating functions of the inappropriate region detecting unit including removal information.
FIG. 18 is an explanatory diagram describing removal information.

In a case where an inappropriate factor is identified, the identified inappropriate factor can be utilized. For example, in accordance with the identified inappropriate factor, a removal method for removing the inappropriate factor can be reported to the doctor. In this case, the inappropriate region detecting unit 14 includes removal information 121 in which inappropriate factors and methods for removing the inappropriate factors are associated with each other, as illustrated in FIG. 17. The removal information 121 is information in which each inappropriate factor is associated with a removal method for removing the inappropriate factor. Based on the inappropriate factor identified in the inappropriate factor identification process and the removal information 121, a removal method for the inappropriate region can be reported as the inappropriate factor identification result 92.

Specifically, as illustrated in FIG. 18, in the removal information 121, a removal method such as "supply water to the photographic subject or residue" is associated as a removal method when the inappropriate factor is the presence of a residue, "slow down scope operation" or the like is associated as a removal method when the inappropriate factor is "unsharpness", and "supply air and water to the lens surface" or the like is associated as a removal method when the inappropriate factor is "lens dirt".

Figure 19:
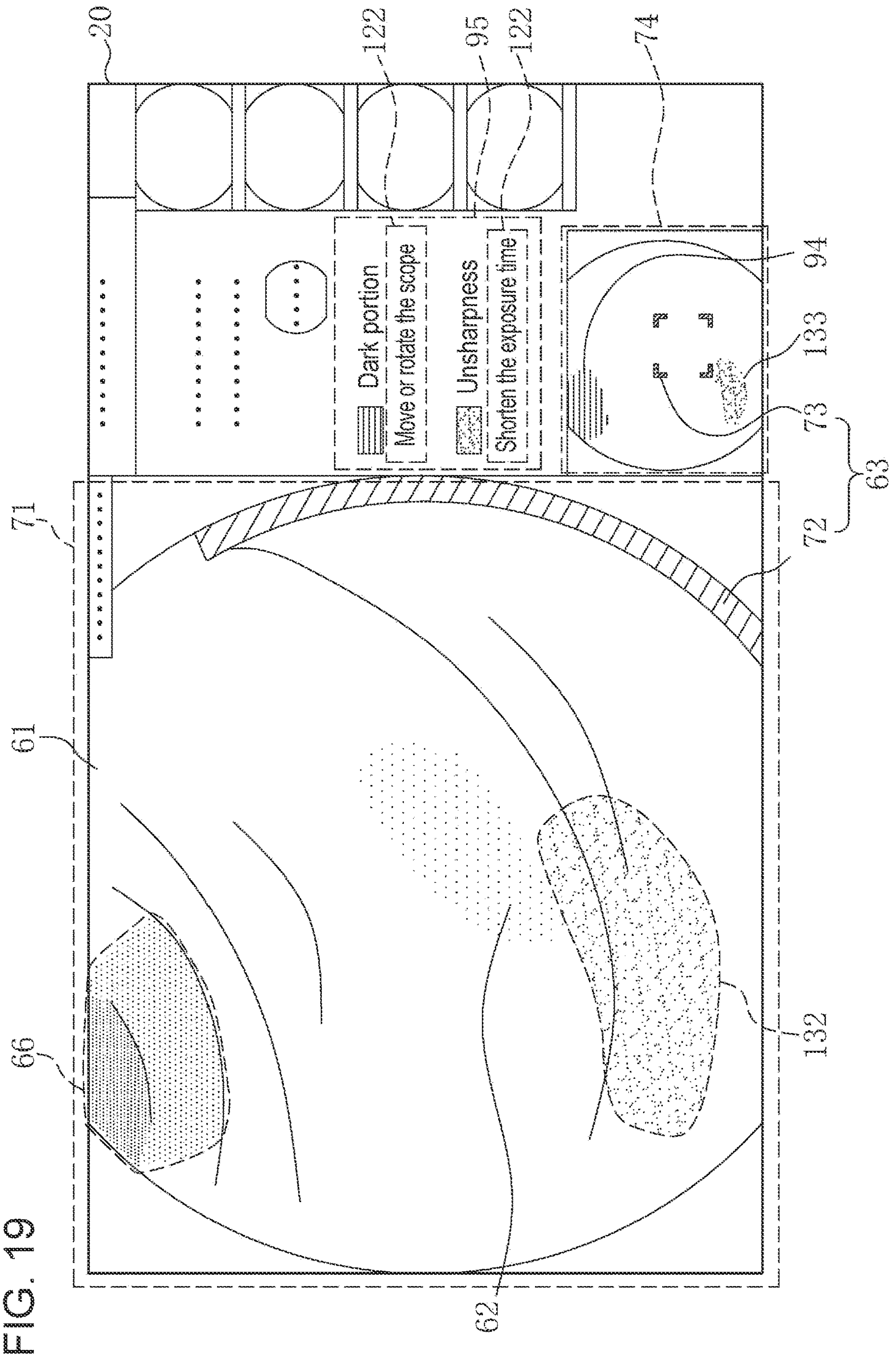
FIG. 19 is an image diagram illustrating reporting of a removal method and an inappropriate factor identification result.

The inappropriate region detecting unit 14 identifies an inappropriate factor in the inappropriate factor identification process and acquires a method for removing the inappropriate factor by using the removal information 121. The inappropriate region detecting unit 14 then reports the inappropriate factor in the inappropriate region and the removal method for removing the inappropriate factor as an identification result. As illustrated in FIG. 19, in the case of reporting an identification result by displaying an image or the like, the endoscopic image 61, the recognition process result 63, the dark region identification result 94 and an unsharp region identification result 133 that correspond to the inappropriate factor identification result 92, and removal methods 122 for removing the dark region 66 and an unsharp region 132 that are inappropriate factors are displayed on the display 20. "Move or rotate the scope" is displayed as the removal method 122 for the dark region 66, and "shorten the exposure time" is displayed as the removal method 122 for the unsharp region 132.

In the case of reporting the removal method 122 by display, the mode of display on the display 20 can be set in advance. For example, the removal method 122 may be displayed in a region other than the main region 71 so as not to hinder observation of the endoscopic image 61, or the removal method 122 may be displayed so as to be superimposed on the main region 71 in the case of prioritizing recognition of the removal method 122.

Figure 20:
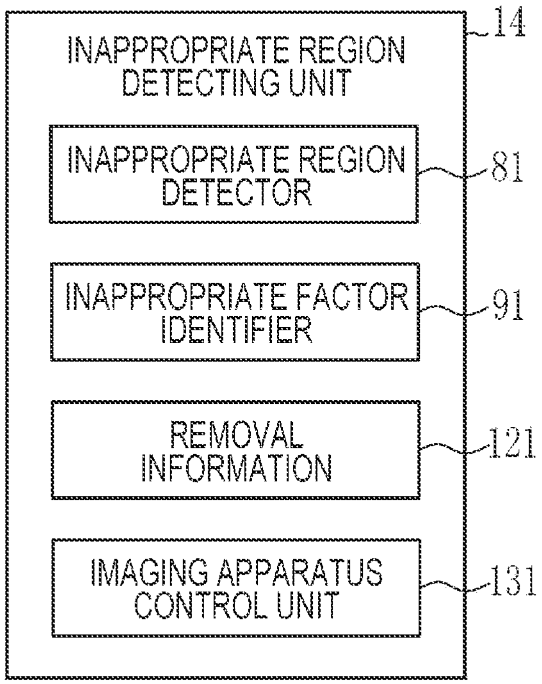
FIG. 20 is a block diagram illustrating functions of the inappropriate region detecting unit including an imaging apparatus control unit.

When an inappropriate factor can be removed by operating an imaging apparatus for capturing a medical image, such as the endoscope apparatus 18, the medical image processing apparatus 10 may perform control to cause the imaging apparatus to execute the removal method 122 for removing the inappropriate factor. In this case, the inappropriate region detecting unit 14 includes an imaging apparatus control unit 131, as illustrated in FIG. 20. The imaging apparatus control unit 131 receives the removal method 122 and controls, based on the removal method 122, the imaging apparatus that captures an image of a subject to generate a medical image. Preferably, the removal method 122 is automatically executed by the imaging apparatus.

In the present embodiment, the imaging apparatus is the endoscope apparatus 18 that acquires the endoscopic image 61, and thus the imaging apparatus control unit 131 controls the endoscope apparatus 18 to execute the removal method 122 for removing an inappropriate factor. An item that enables an inappropriate factor to be removed by an operation of the endoscope apparatus 18 is an item adjusted at the time of capturing the endoscopic image 61, and may be, for example, an exposure time, a frame rate, a magnification factor, illumination light, or the like.

Figure 21:
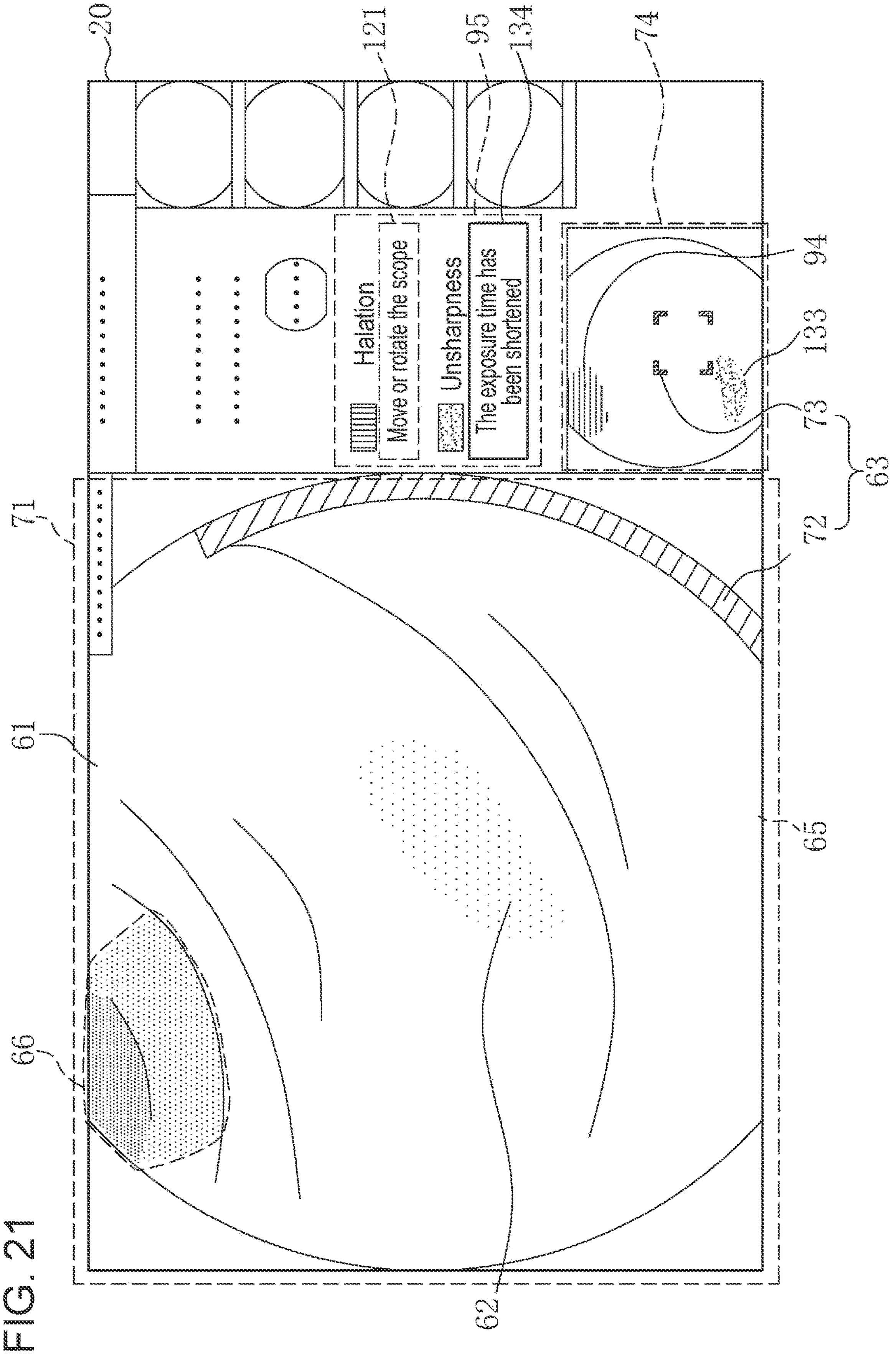
FIG. 21 is an image diagram illustrating reporting of removal execution information and an inappropriate factor identification result.

When control has been performed to cause the imaging apparatus to execute the removal method 122 for removing an inappropriate factor, it is preferable to report that the inappropriate factor has been removed. As illustrated in FIG. 21, in the case illustrated in FIG. 19, when the imaging apparatus control unit 131 has shortened the exposure time in the endoscope apparatus 18 to remove unsharpness which is an inappropriate factor, removal execution information 134 indicating "the exposure time has been shortened" may be displayed in the inappropriate factor legend 95 on the display 20 to report that the inappropriate factor has been removed. By checking the main region 71, the doctor is able to recognize that the detected inappropriate factor of unsharpness has been removed. In this case, the region of the inappropriate factor in the unsharp region identification result 133 before the unsharpness is removed may be displayed on the position map in the sub-region 74 for a certain period of time so that the doctor can recognize the region that had the inappropriate factor.

An identified inappropriate factor can also be utilized in the following manner. For example, an inappropriateness degree indicating the degree of inappropriateness for an image recognition process can be identified and used for each inappropriate factor. The inappropriate region detecting unit 14 identifies, using the inappropriate factor identifier 91, the inappropriateness degree of each inappropriate factor. The reporting control unit 15 is capable of performing, based on the inappropriateness degree, control to vary the mode of reporting a detection result of an inappropriate region detection process.

The inappropriateness degree represents the degree to which the inappropriate factor is inappropriate for an image recognition process, and can be set for each inappropriate factor or in accordance with the type of image recognition process. For example, in a case where the type of image recognition process is a process of detecting a region of interest and where the inappropriate factor is a blur, the inappropriateness degree of the inappropriate factor of a blur in the process of detecting a region of interest can be calculated based on the amount of blur calculated by means for calculating the amount of blur, for example, by setting a weighting coefficient for the calculated amount of blur to 1.

Depending on an inappropriate factor, the inappropriate factor itself may be regarded as an inappropriateness degree. For example, in a case where the inappropriate factor is the correct diagnosis rate in the process of detecting a region of interest, the correct diagnosis rate itself may be regarded as an inappropriateness degree. In a case where the inappropriate factor is a residue, the ratio of the area in which the residue is present to the area of the entire endoscopic image 61 may be regarded as an inappropriateness degree. Preferably, an inappropriateness degree is set for each inappropriate factor so as to more appropriately indicate the degree to which the inappropriate factor is inappropriate for an image recognition process.

The inappropriateness degree may be calculated by the inappropriate factor identifier 91. As described above, depending on the type of learning model, the percentages of a plurality of items can be output as a result. Accordingly, the inappropriate factor identifier 91 may output the inappropriateness degrees of individual inappropriate factors.

For example, in a case where the inappropriate factor is a blur, the objective function has three classes: a low-level blur, a medium-level blur, and a high-level blur, and an inappropriate region is classified in the proportions of the three classes of blur. The class having the highest proportion can be regarded as the inappropriateness degree of blur in the inappropriate region. The inappropriate factor identifier 91 is capable of calculating the inappropriateness degrees of the other inappropriate factors in a similar manner.

The reporting control unit 15 is capable of performing, based on the inappropriateness degree, control to vary the mode of reporting the inappropriate region detection result 82. In this case, it is preferable to perform, based on the inappropriateness degree and a preset threshold value of inappropriateness degree, control to vary the mode of reporting the inappropriate region detection result 82. The threshold value of inappropriateness degree can be set in advance for each inappropriate factor. The threshold value may be a preset value related to an inappropriateness degree, and includes a minimum value or a maximum value of inappropriateness degree. Alternatively, the following reporting mode may be employed: an inappropriate factor is not reported even when the inappropriate factor is identified, or an inappropriate factor is reported regardless of the inappropriateness degree when the inappropriate factor is identified.

As illustrated in FIG. 22, the inappropriate region detecting unit 14 may include inappropriateness degree threshold value information 135 having information in which a reporting mode is varied based on the threshold value of inappropriateness degree that is set for each detected inappropriate factor. As illustrated in FIG. 23, the inappropriateness degree threshold value information 135 has, for each inappropriate factor, information indicating the details of an inappropriateness degree and threshold values of inappropriateness degree for performing reporting in individual image detection processes. In the case illustrated in FIG. 23, reporting is performed when the inappropriateness degree is higher than or equal to the threshold value. In the case of setting the modes of reporting in more detail, a plurality of types of threshold values may be set so that, for example, whether to perform reporting can be determined based on a first threshold value and the mode of reporting can be varied based on a second threshold value. The reporting control unit 15 is capable of performing, based on the inappropriateness degree threshold value information 135, control to vary the mode of reporting the inappropriate region detection result 82.

The threshold values of inappropriateness degree make it possible to perform reporting when it is necessary and not to perform reporting when an endoscopic examination is hindered by frequent reporting. For example, when a blur or unsharpness occurs as a result of a doctor moving a scope, it is obvious to the doctor that the endoscopic image 61 includes an inappropriate region. Thus, the threshold value of inappropriateness degree can be set to be high so that reporting is not performed in this case. Thus, use of the threshold values of inappropriateness degree makes it possible to control reporting in detail.

An inappropriateness degree can be regarded as a quantified inappropriate factor, and thus the inappropriateness degree of an inappropriate factor can be used as an inappropriate factor constituting a composite inappropriate factor, as described above. The inappropriate region detecting unit 14 may use a plurality of inappropriateness degrees identified for individual types of inappropriate factors to obtain a composite inappropriate factor, and may vary, based on the composite inappropriate factor, the mode of reporting a detection result. In this case, the individual inappropriateness degrees may be weighted to obtain a composite inappropriate factor. Alternatively, calculation such as addition, subtraction, multiplication, division, or the like may be performed by using the individual inappropriateness degrees to obtain a composite inappropriate factor.

For example, when the inappropriateness degree of a blur is higher than or equal to a preset value in a composite inappropriate factor obtained by combining an inappropriate factor of a blur and another inappropriate factor, the other inappropriateness degree need not be reported. When the amount of blur is large and the inappropriateness degree of the blur is high, the scope is moving in many cases. This is because it is considered that, while the scope is moving, inappropriate factors are not removed unless the blur is removed even if the other inappropriate factor is reported and removed. In the case of varying the mode of reporting a detection result based on a composite inappropriate factor, a threshold value for the composite inappropriate factor may be set and used to determine the mode of reporting, as in the case of the inappropriateness degree. As described above, use of a composite inappropriate factor makes it possible to control reporting in detail in accordance with the scene of an examination.

Next, a description will be given of the case of using a threshold value related to reporting. When performing control to report a detection result, the reporting control unit 15 may set a threshold value related to reporting in advance. The reporting control unit 15 may perform, based on the threshold value related to reporting, control to vary the mode of reporting a detection result.

The threshold value related to reporting can be set not only for information based on a detected inappropriate region, such as an inappropriate factor, an inappropriateness degree, or a composite inappropriate factor, but also for information based on the endoscopic image 61 used in a detection process or the like, or information such as an imaging condition for capturing the endoscopic image 61.

For example, the threshold value related to reporting can be set for the reliability of a processing result in the region-of-interest detector 51, the inappropriate region detector 81, or the inappropriate factor identifier 91. The reliability in a learning model can be calculated by using any of various calculation methods, for example, a confusion matrix, accuracy, precision, recall, or the like. Any one of these can be adopted as reliability, a threshold value can be set for the reliability, and control can be performed such that reporting is not performed when the reliability is higher than or equal to the threshold value.

The threshold value related to reporting can be set for a value of a determination algorithm used by the inappropriate exposure detecting unit 101, the inappropriate focus detecting unit 102, the residue detecting unit 103, or the like in a case where an inappropriate factor is identified in image processing performed by the inappropriate exposure detecting unit 101, the inappropriate focus detecting unit 102, the residue detecting unit 103, or the like (see FIG. 15). In the case of the inappropriate exposure detecting unit 101, when the value of the determination algorithm is smaller than the set threshold value, the contrast is lower than the set value in the inappropriate region. Thus, when the value of the determination algorithm in the inappropriate exposure detecting unit 101 is smaller than the set threshold value, there is a high possibility that a blur or unsharpness has occurred, and thus control can be performed not to perform reporting in this case.

In the case of performing setting by using information such as an imaging condition for capturing the endoscopic image 61, for example, temporal continuity in the imaging condition of the endoscopic image 61 or spatial continuity of the endoscopic image 61 itself can be used.

As for temporal continuity in the imaging condition of the endoscopic image 61, for example, control can be performed such that reporting is performed when at least one inappropriate factor continues in ten or more consecutive frames of the endoscopic image 61. As for spatial continuity of the endoscopic image 61 itself, the pixel values of the endoscopic image 61 can be used, and control can be performed such that reporting is performed when an inappropriate factor has been detected in a rectangular region formed of ten or more pixels in the vertical direction and ten or more pixels in the horizontal direction in the number of pixels, for example.

As described above, as a result of setting a threshold value related to reporting by using information other than an inappropriate region, such as an inappropriate factor, reporting can be controlled in detail, and for example, erroneous detection or the like of an inappropriate factor can be eliminated.

Next, a description will be given of storage of the inappropriate region detection result 82 or the like. Preferably, the medical image processing apparatus 10 is connected to the data storage unit 17 serving as an image storage unit and performs control to store, in the data storage unit 17, the endoscopic image 61 and an information-superimposed image that is obtained by superimposing at least one of the recognition process result 63, the inappropriate region detection result 82, or the inappropriate factor identification result 92 on the endoscopic image 61. The recognition process result 63, the inappropriate region detection result 82, or the inappropriate factor identification result 92 each include, as described above, an inappropriateness degree, various threshold values, or the like in addition to an inappropriate factor. These pieces of information are stored in the temporary storage unit 16 every time a result is output. Thus, these pieces of information stored in the temporary storage unit 16 can be integrated to create an information-superimposed image.

The information-superimposed image is, for example, an image obtained by superimposing, on the endoscopic image 61, the detected region-of-interest indication frame 72 indicating the recognition process result 63 of detecting a region of interest, and the detected inappropriate region 83 (see FIG. 11). The various results to be superimposed on the endoscopic image 61 and the mode of superimposition can be set as appropriate.

The medical image processing apparatus 10 may be connected to the data storage unit 17 and may perform control to store, in the data storage unit 17, an information-accompanied image obtained by adding at least one of the recognition process result 63, the inappropriate region detection result 82, or the inappropriate factor identification result 92 to accompanying information of the endoscopic image 61.

In an examination using the endoscope apparatus 18, the endoscopic image 61 may be accompanied by patient information for identifying a patient. For example, the endoscopic image 61 including a moving image or examination information data is standardized by the Digital Imaging and Communications in Medicine (DICOM) standard, and this standard includes personal information of a patient, such as the name of the patient.

An information-accompanied image is an image having added thereto at least one of the recognition process result 63, the inappropriate region detection result 82, or the inappropriate factor identification result 92 as accompanying information, similarly to the accompanying information such as the name of a patient. As in the case of the information-superimposed image, each of the recognition process result 63, the inappropriate region detection result 82, and the inappropriate factor identification result 92 includes, as described above, an inappropriateness degree, various threshold values, or the like in addition to an inappropriate factor. These pieces of information are stored in the temporary storage unit 16 every time a result is output. Thus, these pieces of information stored in the temporary storage unit 16 can be integrated to create an information-accompanied image. In general, accompanying information may be referred to as a tag, and accompanying information and a tag can be the same.

Figure 24:
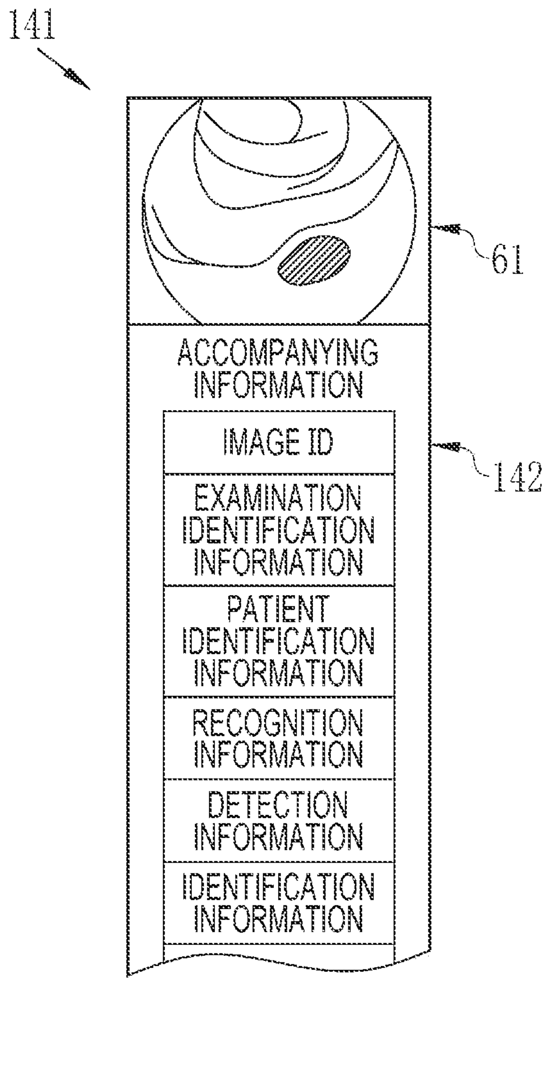
FIG. 24 is an explanatory diagram describing an information-accompanied image.

As illustrated in FIG. 24, an information-accompanied image 141 has, in addition to an image ID identifying an image, examination identification information identifying an examination, and patient identification information identifying a patient, which are normally attached as accompanying information 142 of the endoscopic image 61, the recognition process result 63 described as recognition information, the inappropriate region detection result 82 described as detection information, and the inappropriate factor identification result 92 described as identification information. The information to be accompanied can be selected as appropriate.

The data storage unit 17 serving as an image storage unit is included in the medical image processing apparatus 10, but the image storage unit may be included in an external apparatus other than the medical image processing apparatus 10. For example, storage in an image management system or the like used in a medical facility, or storage in the cloud via an external network is possible.

The information-superimposed image or the information-accompanied image 141 is an image having various pieces of information about results, and thus these pieces of information can be used in various ways. For example, it is possible to search for these pieces of information and select an information-superimposed image. Thus, as a result of storing and using the information-superimposed image, an image to be recorded on an examination report, a medical record, or the like, an image to be sent for secondary interpretation, or the like can be automatically selected in some cases.

Next, a description will be given of the quality of the endoscopic image 61 based on a detection result of an inappropriate region detection process. The medical image processing apparatus 10 calculates, based on a detection result of an inappropriate region detection process that the endoscopic image 61 has, a quality index of the endoscopic image 61. Preferably, the quality index is calculated for each endoscopic image 61. The display control unit 13 performs control to display the quality index on the display 20. Thus, at the time of displaying the endoscopic image 61 on the display 20, the doctor is able to designate whether to display the quality index. In response to the designation, the display control unit 13 performs control to display the quality index in accordance with the endoscopic image 61.

Figure 25:
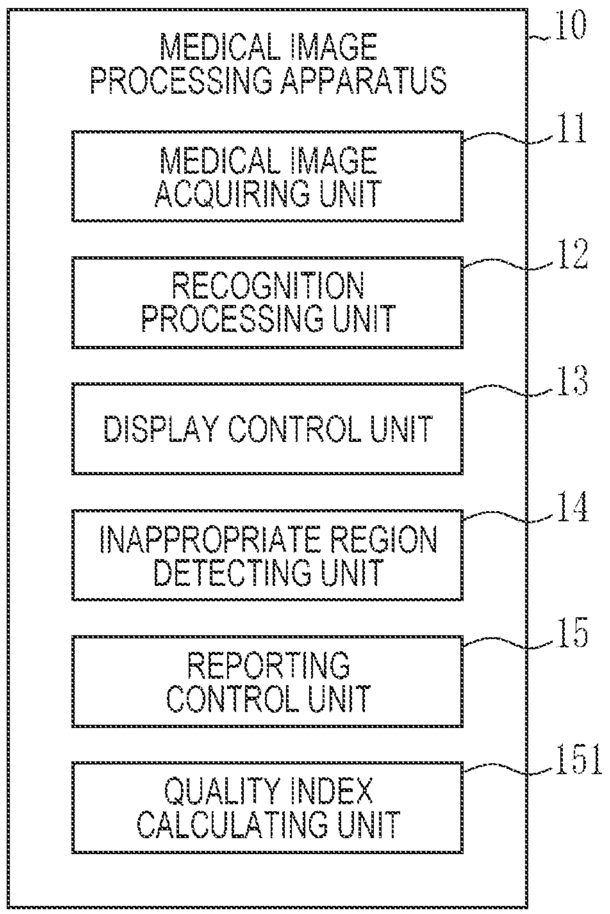
FIG. 25 is a block diagram illustrating functions of the medical image processing apparatus including a quality index calculating unit.

In this case, the medical image processing apparatus 10 includes a quality index calculating unit 151, as illustrated in FIG. 25. The quality index calculating unit 151 calculates, based on the inappropriate region detection result 82 in the endoscopic image 61, a quality index of the endoscopic image 61. The quality index is an index indicating the quality of the endoscopic image 61. For example, the inappropriate region detection result 82 can be used as an integrated index for each endoscopic image 61, and specifically, for example, the ratio of the size of a region other than an inappropriate region to the size of the endoscopic image 61 can be used. In this case, it is possible to evaluate that the quality increases as the quality index decreases and that the quality decreases as the quality index increases.

Figure 26:
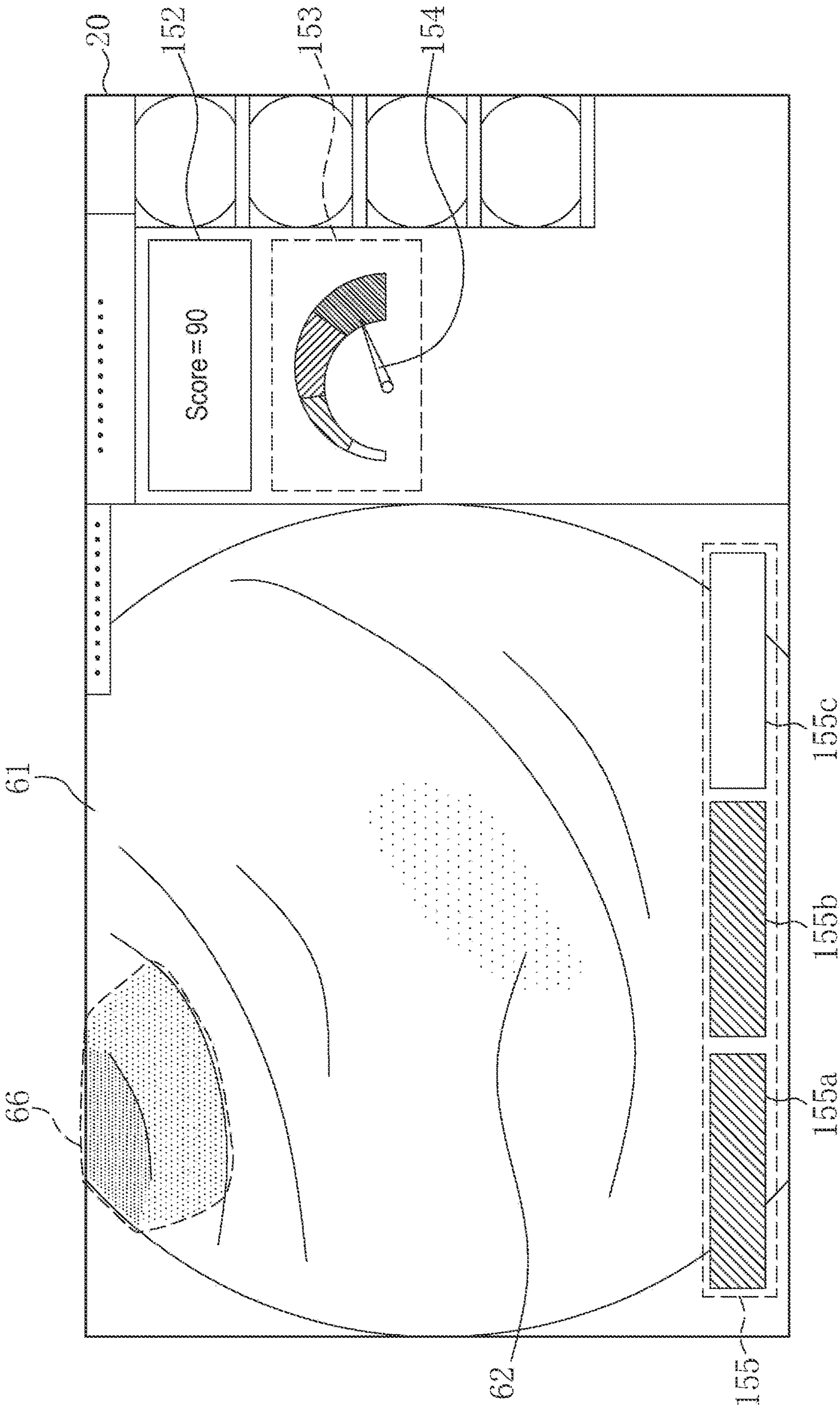
FIG. 26 is an image diagram illustrating a quality index that is displayed.

The quality index may be displayed in any manner as long as a low level of the quality index can be recognized. For example, the quality index may be indicated in the form of a numerical value, a meter, or an indicator. As illustrated in FIG. 26, for example, in a case where an inappropriate region, which is the dark region 66, is present in a portion having a size of 10% of the entire size of the endoscopic image 61 in the endoscopic image 61, the quality index calculating unit 151 calculates, based on the inappropriate region detection result 82, that the ratio of the size of the region other than the inappropriate region to the size of the endoscopic image 61 is 90%. A score index 152 indicates the quality index in the form of a numerical value from 1 to 100. Thus, the score index 152 indicates the text "Score=90". Similarly, in a meter index 153, in the figure of a meter, a higher index is indicated as the point pointed by a meter pointer 154 is closer to the right end, and a score of about 90 is indicated here. Similarly, in an indicator index 155, each indicator is displayed in a color to indicate a value of the index. A first indicator 155*a* is displayed in a color when the quality index reaches 33, a second indicator 155*b* is displayed in a color when the quality index reaches 66, and a third indicator 155*c* is displayed in a color when the quality index reaches 100.

As a result of reporting the quality index in the form of a figure, text, or the like on the display 20, the quality of the entire endoscopic image 61 can be immediately grasped.

Use of the quality index makes it possible to calculate the score of the overall endoscopic examination. The quality index calculating unit 151 further calculates an overall examination score based on the quality indices of a plurality of endoscopic images acquired in the examination. Subsequently, the display 20 is controlled to display the overall examination score.

Depending on the purpose of an examination, in an endoscopic examination using the endoscope apparatus 18, the doctor acquires and stores endoscopic images 61 at points of individual areas of a lumen important for the examination. Quality indices can be calculated for the endoscopic images 61 acquired in the individual areas, and the quality indices can be displayed in a list view.

Figure 27:
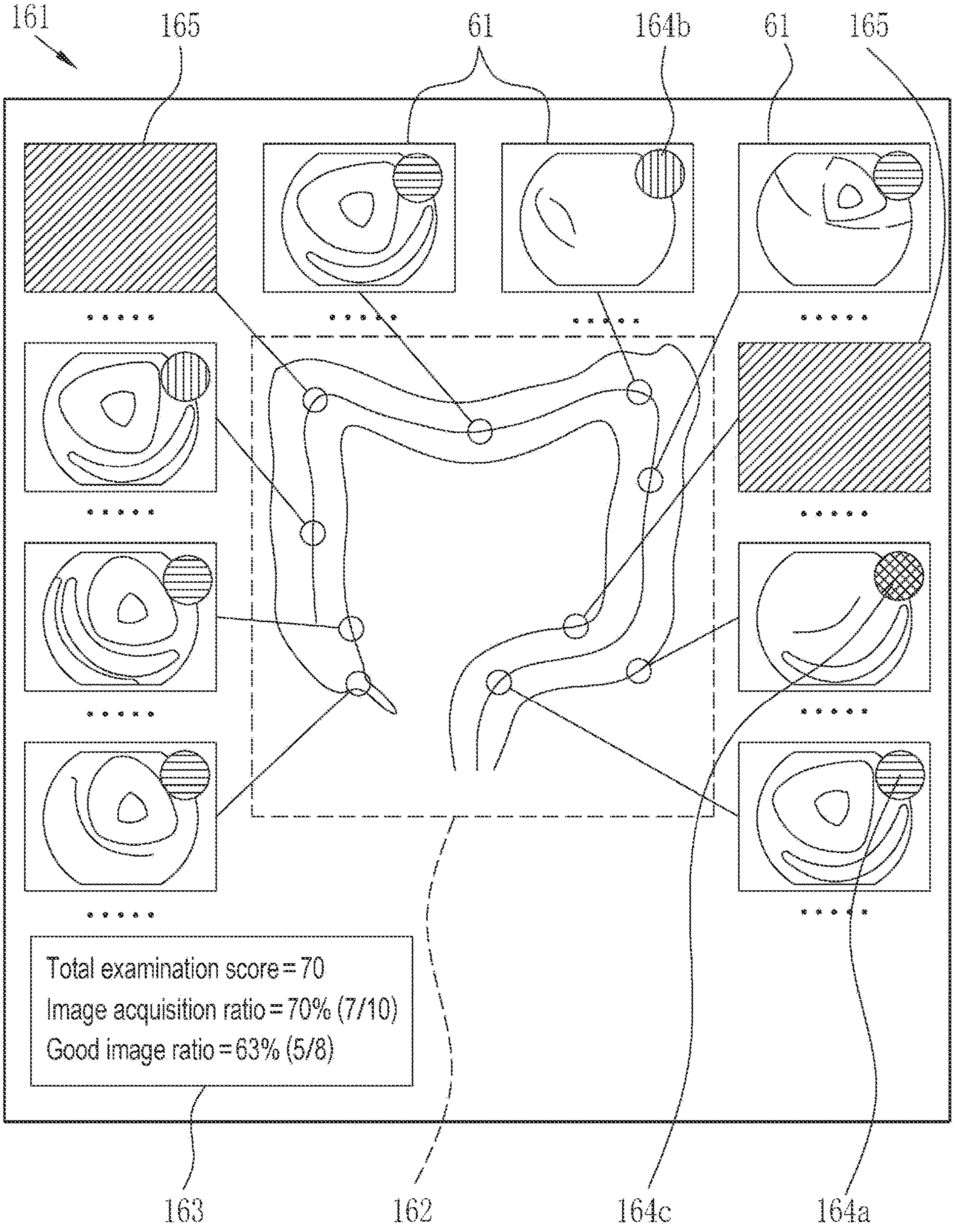
FIG. 27 is an image diagram describing an overall map.

As illustrated in FIG. 27, the endoscopic images 61 acquired at the points of the individual areas of the lumen are displayed in an overall map 161 of the examination. The points of the individual areas are points at which the endoscopic images 61 are to be acquired in the examination. The overall map 161 is constituted by a schematic view 162, a plurality of endoscopic images 61, and a score display portion 163. In the drawings, reference numerals may be given to only a part thereof to avoid complexity.

For example, in a lower endoscopic examination, the points of the individual areas for which the endoscopic images 61 are to be acquired are indicated in the schematic view 162, and the endoscopic images 61 acquired at the points of the individual areas are disposed around the schematic view 162. Each endoscopic image 61 is displayed with a quality indication mark indicating the quality index of the endoscopic image 61 being superimposed thereon. The quality indication mark includes three types of quality indication marks: a good-quality mark 164*a* indicating "good" in which the quality index is 66 or more; an acceptable-quality mark 164*b* indicating "acceptable" in which the quality index is within the range of 33 to 65; and an unacceptable-quality mark 164*c* indicating "unacceptable" in which the quality index is within the range of 1 to 32, which are displayed in colors different from each other. The position where no endoscopic image 61 is displayed is an endoscopic image non-acquired area 165, which is an area where no endoscopic image 61 has been acquired in the examination.

In the score display portion 163, a total examination score of the endoscopic images 61 displayed on the overall map 161, an image acquisition ratio, and a good image ratio are displayed in text. The total examination score is a value obtained by averaging the quality indices of the endoscopic images 61 displayed on the overall map 161, and is represented by a numerical value within the range of 0 to 100. In the case of FIG. 27, the total examination score is 70. The image acquisition ratio is the ratio of the number of actually acquired endoscopic images 61 to the number of endoscopic images 61 to be acquired in the examination. In the case of FIG. 27, the image acquisition ratio is 70% because seven endoscopic images 61 have been acquired although ten endoscopic images 61 are to be acquired. The good image ratio is the ratio of the number of endoscopic images 61 having a good quality index to the number of actually acquired endoscopic images 61. In the case of FIG. 27, the good image ratio is 63% because five of the eight acquired endoscopic images 61 have a good quality index.

Use of the quality index makes it possible to grasp the quality of the endoscopic image 61 acquired in the examination at a glance. In addition, it is possible to acquire information indicating the quality of an endoscopic image of an area necessary in an endoscopic examination, information indicating whether reexamination is necessary, or the like, and such information can be used to plan a future examination, treatment, or the like.

Figure 28:
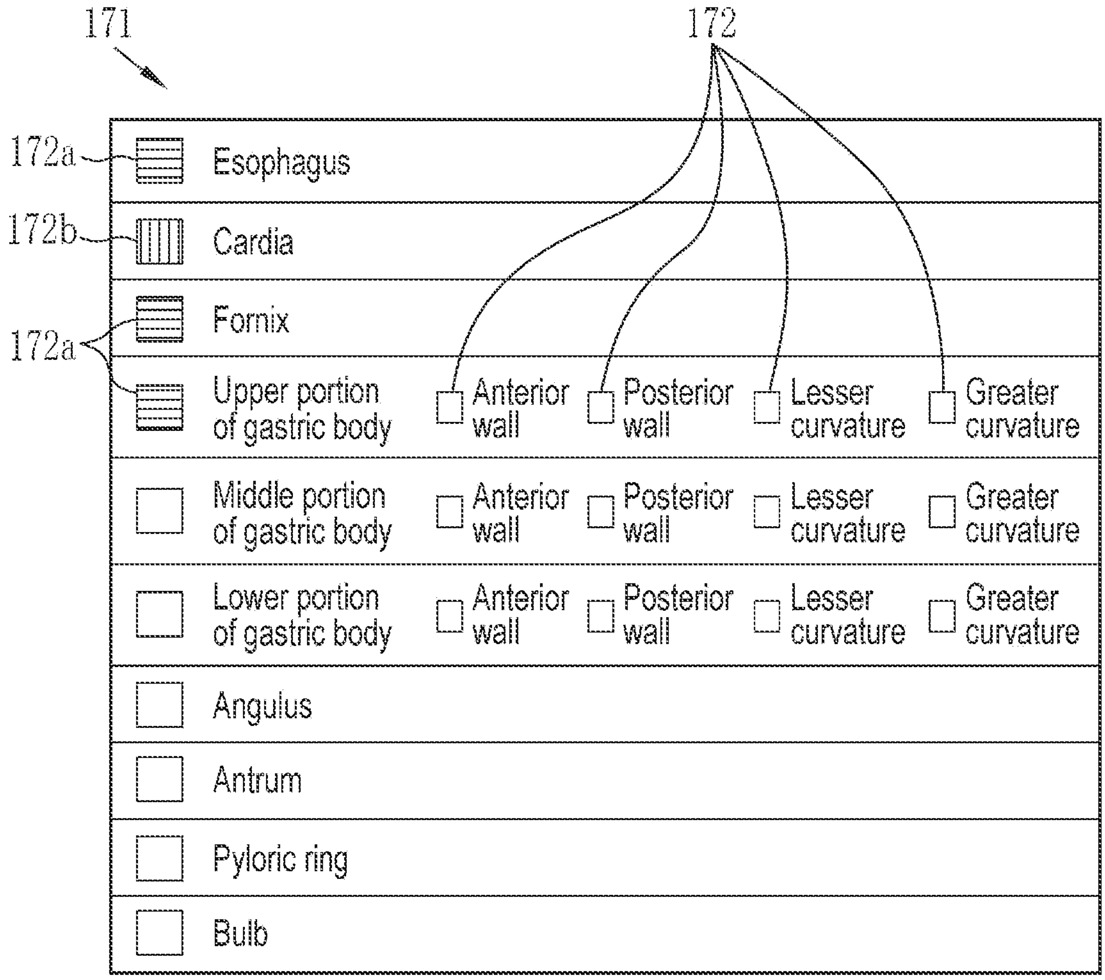
FIG. 28 is an image diagram describing an overall check sheet.

Alternatively, a check sheet can be used instead of the overall map 161 to check the quality indices and the acquired endoscopic images 61. As illustrated in FIG. 28, an overall check sheet 171 is constituted by the names of areas for which the endoscopic images 61 are to be acquired in an endoscopic examination, and square-shaped quality-index-appended check fields 172 located on the left of the rows of the individual names of areas. The quality-index-appended check field is colored in accordance with the quality index of the endoscopic image 61, the quality index being calculated as soon as the endoscopic image 61 of the target area is acquired. In the overall check sheet 171, the check field on the left of the row having an area name "esophagus" has the color of a good-quality checkmark 172*a*, which indicates that the endoscopic image 61 having a quality index "good"

has been acquired for the area "esophagus" in the examination. Similarly, the check field on the left of the row having an area name "cardia" has the color of an acceptable-quality checkmark 172*b*, which indicates that the endoscopic image 61 having a quality index "acceptable" has been acquired for the area "cardia" in the examination. In the figure, the same type of hatching represents the same color. The area name for which the check field is not colored indicates that the endoscopic image 61 of the area has not been acquired.

These check fields are automatically given area names and quality indices because the area names are automatically given to the endoscopic images 61 through an area identification process or the like after the endoscopic images 61 have been acquired and the quality indices are automatically calculated as described above.

As a result of creating the overall check sheet 171 of the examination by using quality indices, the check fields assigned to the area names are displayed in different colors. This makes it is possible to grasp, at a glance, the area for which the endoscopic image 61 has been acquired with which quality. In a case where the overall check sheet 171 is checked during an examination, it is possible to prevent an endoscopic image 61 of a necessary area from being forgotten to be captured. In a case where an endoscopic image 61 whose quality index is unacceptable has been acquired, it is a trigger to reacquire an endoscopic image 61 having better quality.

Figure 29:
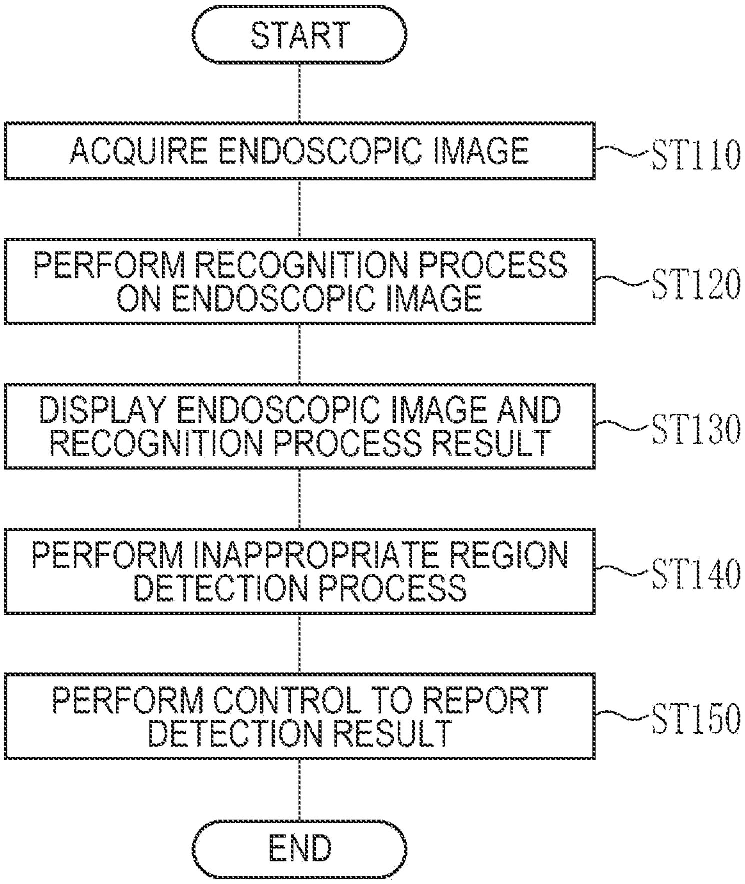
FIG. 29 is a flowchart describing the flow of a process performed by the medical image processing apparatus.

Next, a description will be given of the flow of a process performed by the medical image processing apparatus 10 according to the present embodiment. As illustrated in FIG. 29, the medical image acquiring unit 11 acquires the endoscopic image 61 acquired by the endoscope apparatus 18 (step ST110). The endoscopic image 61 includes a subject. The recognition processing unit 12 performs an image recognition process for detecting a region of interest of the subject on the endoscopic image 61 acquired by the medical image acquiring unit 11 (step ST120). The endoscopic image 61 and the recognition process result 63 are displayed on the display 20 (step ST130).

Subsequently, an inappropriate region detection process of detecting an inappropriate region inappropriate for an image recognition process of detecting a region of interest is performed based on the endoscopic image 61 (step ST140). Based on a detection result of the inappropriate region detection process, control is performed to report the detection result (step ST150).

The above-described embodiment and so forth include a medical image processing program that causes a computer to execute a process of acquiring a medical image including an image of a subject; a process of performing, based on the medical image, an image recognition process; a process of performing control to display the medical image and a result of the image recognition process on a display; a process of performing, based on the medical image, an inappropriate region detection process of detecting an inappropriate region which is a region inappropriate for the image recognition process; and a process of performing, based on a detection result of the inappropriate region detection process, control to report the detection result.

In the above-described embodiment, the hardware structure of processing units, such as the medical image acquiring unit 11, the recognition processing unit 12, the display control unit 13, the inappropriate region detecting unit 14, and the reporting control unit 15, included in the medical image processing apparatus 10 serving as a processor apparatus may be various types of processors described below. The various types of processors include a central processing unit (CPU), which is a general-purpose processor executing software (program) and functioning as various processing units; a programmable logic device (PLD), which is a processor whose circuit configuration is changeable after manufacturing, such as a field programmable gate array (FPGA); a dedicated electric circuit, which is a processor having a circuit configuration designed exclusively for executing various processing operations, and the like.

A single processing unit may be constituted by one of these various types of processors or may be constituted by a combination of two or more processors of the same type or different types (for example, a combination of a plurality of FPGAs or a combination of a CPU and an FPGA). A plurality of processing units may be constituted by a single processor. Examples of constituting a plurality of processing units by a single processor are as follows. First, as represented by a computer of a client or server, a single processor is constituted by a combination of one or more CPUs and software, and the processor functions as a plurality of processing units. Secondly, as represented by a system on chip (SoC), a processor in which a single integrated circuit (IC) chip implements the function of an entire system including a plurality of processing units is used. In this way, various types of processing units are constituted by using one or more of the above-described various types of processors as a hardware structure.

Furthermore, the hardware structure of the various types of processors is, more specifically, electric circuitry formed by combining circuit elements such as semiconductor elements.

REFERENCE SIGNS LIST

10 medical image processing apparatus
11 medical image acquiring unit
12 recognition processing unit
13 display control unit
14 inappropriate region detecting unit
15 reporting control unit
16 temporary storage unit
17 data storage unit
18 endoscope apparatus
19 PACS
20 display
21 input device
31 control unit
32 communication unit
33 storage unit
34 data bus
35 network
41 CPU
42 RAM
43 ROM
44 medical image processing apparatus program
45 medical image processing apparatus data
51 region-of-interest detector
61 endoscopic image
62 region of interest
63 recognition process result
64 detected region of interest
65 halation region
66 dark region
71 main region
72 detected region-of-interest indication frame
73 detected region-of-interest indication FIG.
74 sub-region

75 classification result indication text
76 color-based classification result indication
77 area name indication text
78 area-name-tile emphasized indication
81 inappropriate region detector
82 inappropriate region detection result
83 detected inappropriate region
91 inappropriate factor identifier
92 inappropriate factor identification result
93 halation region identification result
94 dark region identification result
95 inappropriate factor legend
101 inappropriate exposure detecting unit
102 inappropriate focus detecting unit
103 residue detecting unit
111 residue region
112 residue region identification result
121 removal information
122 removal method
131 imaging apparatus control unit
132 unsharp region
133 unsharp region identification result
134 removal execution information
135 inappropriateness degree threshold value information
141 information-accompanied image
142 accompanying information
151 quality index calculating unit
152 score index
153 meter index
154 meter pointer
155 indicator index
155*a* first indicator
155*b* second indicator
155*c* third indicator
161 overall map
162 schematic view
163 score display portion
164*a* good-quality mark
164*b* acceptable-quality mark
164*c* unacceptable-quality mark
165 endoscopic image non-acquired area
171 overall check sheet
172 quality-index-appended check field
172*a* good-quality checkmark
172*b* acceptable-quality checkmark
ST110 to ST150 step

What is claimed is:

1. A medical image processing apparatus comprising:
one or more processors configured to:
acquire a medical image including an image of a subject;
perform, based on the medical image, an image recognition process using an image recognizing learning model constructed by performing training using a machine learning algorithm;
perform control to display the medical image and a result of the image recognition process on a display;
perform, based on the medical image, an inappropriate region detection process of detecting an inappropriate region which is a region inappropriate for the image recognition process using an inappropriate region detecting learning model constructed by performing training using a machine learning algorithm;
perform, based on the medical image, an inappropriate factor identification process of identifying an inappropriate factor in which the inappropriate region is inappropriate for the image recognition process, using an inappropriate factor identifying learning model constructed by performing training using a machine learning algorithm,
wherein the inappropriate factor is a correct diagnosis rate being lower than or equal to a preset value, and
wherein the correct diagnosis rate, being calculated based on a degree of agreement between the result of the image recognition process and a diagnosis made by a doctor, is lower than or equal to a preset threshold value; and
perform, based on an identification result of the inappropriate factor identification process, control to report the identification result,
wherein the one or more processors are configured to control to report the identification result by at least one of the following:
an image displayed on the display;
vibration generated by a vibration generator; or
sound generated by a sound generator.

2. The medical image processing apparatus according to claim 1, wherein
the inappropriate region detection process specifies a position of the inappropriate region in the medical image, and
the detection result includes the position of the inappropriate region in the medical image.

3. The medical image processing apparatus according to claim 1, wherein the one or more processors are configured to perform control to display, on the display comprising a main region and a sub-region, the medical image in the main region and the detection result in the sub-region.

4. The medical image processing apparatus according to claim 1, wherein the one or more processors are configured to perform control to display, on the display, a superimposed image obtained by superimposing the detection result on the medical image.

5. The medical image processing apparatus according to claim 1, wherein
the identification result includes a plurality of the inappropriate factors, and
the one or more processors are configured to perform control to report the identification result in a mode that varies among the inappropriate factors.

6. The medical image processing apparatus according to claim 1, wherein
the identification result includes a plurality of the inappropriate factors, and
the one or more processors are configured to perform, based on a composite inappropriate factor obtained by combining at least two of the plurality of inappropriate factors, control to report the identification result.

7. The medical image processing apparatus according to claim 1, wherein the inappropriate factor is
a blur or unsharpness in the medical image,
an image of water, blood, a residue, or lens dirt in the medical image, or
an image of a dark portion or a halation portion in the medical image.

8. The medical image processing apparatus according to claim 1, further comprising:
removal information in which the inappropriate factor and a method for removing the inappropriate factor are associated with each other, wherein
the inappropriate factor identification process refers to the inappropriate factor and the removal information to acquire a method for removing the inappropriate factor in the inappropriate region, and the identification result includes the method for removing the inappropriate factor in the inappropriate region.

9. The medical image processing apparatus according to claim 8, wherein the one or more processors are configured to:

control an imaging apparatus that captures an image of the subject to generate the medical image; and perform control to cause the imaging apparatus to execute the method for removing the inappropriate factor.

10. The medical image processing apparatus according to claim 1, wherein the inappropriate region detection process identifies, on an individual inappropriate factor basis, an inappropriateness degree indicating a degree of inappropriateness for the image recognition process, and the one or more processors are configured to perform, based on the inappropriateness degree, control to vary a mode of reporting the detection result.

11. The medical image processing apparatus according to claim 1, wherein the one or more processors are configured to set a threshold value related to the reporting in advance, and perform, based on the threshold value related to the reporting, control to vary a mode of reporting the detection result.

12. The medical image processing apparatus according to claim 1, wherein the one or more processors are connected to an image storage unit, and configured to perform control to store, in the image storage unit, the medical image and an information-superimposed image, that is obtained by superimposing at least one of the result of the image recognition process, the detection result, or the identification result on the medical image.

13. The medical image processing apparatus according to claim 1, wherein one or more processors are connected to an image storage unit, and configured to perform control to store, in the image storage unit, an information-accompanied image obtained by adding at least one of the result of the image recognition process, the detection result, or the identification result to accompanying information of the medical image.

14. The medical image processing apparatus according to claim 1, wherein the one or more processors are configured to:

calculate, based on the inappropriate region that the medical image has, a quality index of the medical image; and perform control to display the quality index on the display.

15. The medical image processing apparatus according to claim 14, wherein the medical image is acquired in an examination of the subject, and the one or more processors are configured to perform control to display an overall examination score on the display, the overall examination score being calculated based on the quality index of each of a plurality of the medical images acquired in the examination.

16. A method for operating a medical image processing apparatus, the method comprising:

a step of acquiring a medical image including an image of a subject;

a step of performing, based on the medical image, an image recognition process using an image recognizing learning model constructed by performing training using machine learning algorithm;

a step of performing control to display the medical image and a result of the image recognition process on a display;

a step of performing, based on the medical image, an inappropriate region detection process of detecting an inappropriate region which is a region inappropriate for the image recognition process using an inappropriate region detecting learning model constructed by performing training using a machine learning algorithm;

a step of performing, based on the medical image, an inappropriate factor identification process of identifying an inappropriate factor in which the inappropriate region is inappropriate for the image recognition process, using an inappropriate factor identifying learning model constructed by performing training using a machine learning algorithm, wherein the inappropriate factor is a correct diagnosis rate being lower than or equal to a preset value, and wherein the correct diagnosis rate, being calculated based on a degree of agreement between the result of the image recognition process and a diagnosis made by a doctor, is lower than or equal to a preset threshold value; and a step of performing, based on an identification result of the inappropriate factor identification process, control to report the identification result, wherein the detection result is reported by at least one of the following:

an image displayed on the display;

vibration generated by a vibration generator; or sound generated by a sound generator.

17. A non-transitory computer readable medium for storing a computer-executable program, the computer-executable program causing a computer to execute:

a process of acquiring a medical image including an image of a subject;

a process of performing, based on the medical image, an image recognition process using an image recognizing learning model constructed by performing training using a machine learning algorithm;

a process of performing control to display the medical image and a result of the image recognition process on a display;

a process of performing, based on the medical image, an inappropriate region detection process of detecting an inappropriate region which is a region inappropriate for the image recognition process using an inappropriate region detecting learning model constructed by performing training using a machine learning algorithm;

a process of performing, based on the medical image, an inappropriate factor identification process of identifying an inappropriate factor in which the inappropriate region is inappropriate for the image recognition process, using an inappropriate factor identifying learning model constructed by performing training using a machine learning algorithm, wherein the inappropriate factor is a correct diagnosis rate being lower than or equal to a preset value, and wherein the correct diagnosis rate, being calculated based on a degree of agreement between the result of the image recognition process and a diagnosis made by a doctor, is lower than or equal to a preset threshold value; and a process of performing, based on an identification result of the inappropriate factor identification process, control to report the identification result, wherein the detection result is reported by at least one of the following:

an image displayed on the display;

vibration generated by a vibration generator; or sound generated by a sound generator.

* * * * *